US012782612B2

(12) United States Patent
Nishimoto et al.

(10) Patent No.: US 12,782,612 B2
(45) Date of Patent: Nov. 3, 2026

(54) OPTICAL PRODUCT AND OPTICAL PRODUCT MANUFACTURING METHOD

(71) Applicant: TOKAI OPTICAL CO. LTD., Okazaki (JP)

(72) Inventors: Keiji Nishimoto, Okazaki (JP); Chiaki Inoue, Okazaki (JP)

(73) Assignee: TOKAI OPTICAL CO., LTD., Okazaki (JP)

( * ) Notice: Subject to any disclaimer, the term of this patent is extended or adjusted under 35 U.S.C. 154(b) by 417 days.

(21) Appl. No.: 18/363,800

(22) Filed: Aug. 2, 2023

(65) Prior Publication Data

US 2023/0384491 A1 Nov. 30, 2023

Related U.S. Application Data

(63) Continuation of application No. PCT/JP2021/046105, filed on Dec. 14, 2021.

(30) Foreign Application Priority Data

Feb. 8, 2021 (JP) ................................ 2021-018431

(51) Int. Cl.

| | |
|---|---|
| ***G02B 5/02*** | (2006.01) |
| ***G02B 1/115*** | (2015.01) |
| ***G02B 1/118*** | (2015.01) |

(52) U.S. Cl.

CPC ............ *G02B 5/0215* (2013.01); *G02B 1/115* (2013.01); *G02B 1/118* (2013.01); *G02B 5/0231* (2013.01); *G02B 5/0268* (2013.01); *G02B 5/0294* (2013.01)

(58) Field of Classification Search

None

See application file for complete search history.

(56) References Cited

U.S. PATENT DOCUMENTS

| | | | | |
|---|---|---|---|---|
| 2005/0233113 A1 | 10/2005 | Kotani et al. | | |
| 2006/0199040 A1 * | 9/2006 | Yamada ................ | G02B 1/118 428/701 | |

(Continued)

FOREIGN PATENT DOCUMENTS

| | | |
|---|---|---|
| CN | 104583812 A | 4/2015 |
| CN | 111902739 A | 11/2020 |

(Continued)

OTHER PUBLICATIONS

Taiwanese Office Action (with English translation) dated Apr. 11, 2025 (Application No. 111103052).

(Continued)

*Primary Examiner* — Derek S. Chapel

(74) *Attorney, Agent, or Firm* — Muncy, Geissler, Olds & Lowe, P.C.

(57) ABSTRACT

An optical product includes a base, and an optical film formed on a film-formation surface thereof. The optical film has an $Al_2O_3$ layer made of $Al_2O_3$ and disposed on the base side, and an $SiO_2$ layer made of $SiO_2$ and having a minutely uneven structure. The method for manufacturing the optical product includes forming, on the base, an Al-based manufacture intermediate film made of aluminium, an aluminium alloy, or an aluminium compound, and immersing the base having the Al-based manufacture intermediate film in an aqueous solution of silica. The silica in the aqueous solution has a concentration of not greater than 10 mg/l.

8 Claims, 23 Drawing Sheets

(56) References Cited

U.S. PATENT DOCUMENTS

| | | | |
|---|---|---|---|
| 2008/0176038 A1 | 7/2008 | Zhang et al. | |
| 2010/0068536 A1 | 3/2010 | Sano | |
| 2014/0016204 A1 | 1/2014 | Hakuta et al. | |
| 2015/0160377 A1 | 6/2015 | Kuroda et al. | |
| 2015/0219799 A1* | 8/2015 | Sonoda | G02B 1/18 204/192.1 |
| 2018/0074230 A1* | 3/2018 | Yoshizawa | C03C 17/245 |
| 2019/0094438 A1* | 3/2019 | Takada | G02B 5/3058 |
| 2020/0355860 A1 | 11/2020 | Shibuya et al. | |
| 2020/0363571 A1* | 11/2020 | Isshiki | G02B 5/0294 |
| 2020/0408955 A1 | 12/2020 | Nakamura et al. | |

FOREIGN PATENT DOCUMENTS

| | | | |
|---|---|---|---|
| JP | H10-114543 A | | 5/1998 |
| JP | 2008-036605 A | | 2/2008 |
| JP | 2009-162989 A | | 7/2009 |
| JP | 2010038948 A | * | 2/2010 |
| JP | 2010-072046 A | | 4/2010 |
| JP | 2011-028277 A | | 2/2011 |
| JP | 2012-198330 A | | 10/2012 |
| JP | 2014-138992 A | | 7/2014 |
| JP | 2017-107011 A | | 6/2017 |
| JP | 2018-089630 A | | 6/2018 |
| JP | 2019-124970 A | | 7/2019 |
| KR | 10-2008-0022254 A | | 3/2008 |

OTHER PUBLICATIONS

Extended European Search Report dated Oct. 17, 2024 (Application No. 21924842.4).
AQ Chinese Office Action (with English translation) dated Mar. 26, 2024 (Application No. 202180057077.0).
International Search Report and Written Opinion dated Jan. 25, 2022 (Application No. PCT/JP2021/046105).
Chinese Office Action (with English translation) dated Oct. 14, 2023 (Application No. 202180057077.0).

* cited by examiner

2
F 2
22
20

T
20
SL 2
12
14

2
12
14
1

OPTICAL PRODUCT AND OPTICAL PRODUCT MANUFACTURING METHOD

CROSS REFERENCE TO RELATED APPLICATION

This application is a Continuation of International Application No. PCT/JP2021/046105, filed on Dec. 14, 2021, which claims the benefit of Japanese Patent Application Number 2021-018431 filed on Feb. 8, 2021, the disclosures of which are incorporated by reference herein in their entireties.

FIELD OF THE INVENTION

The present invention relates to an optical product having a minutely uneven film formed therein, and a method for manufacturing the optical product.

BACKGROUND OF THE INVENTION

JP 2012-198330 A indicates that a layer that has a minutely uneven structure formed of aluminium (hereinafter also referred to as Al) or a compound thereof is formed on an outermost surface of a substrate having a curved surface, by gas-phase deposition and hydrothermal treatment at a temperature of not lower than 60° C. and not higher than a boiling temperature.

The average height of the projecting portion in the uneven structure is about 5 to 1000 nm.

The density of the film having such a minutely uneven structure (moth-eye structure) is reduced from the substrate side toward the air side. Therefore, the refractive index of the film gradually varies. Accordingly, the film acts so as to have no optical interface and acts like a thin film having a low refractive index. The film exhibits an antireflection effect through such an action and is usable as an antireflection film.

As described above, it is known that the minutely uneven structure formed of aluminium or a compound thereof is produced by aluminium or a compound thereof.

However, a minutely uneven structure formed of another material, in particular, silica ($SiO_2$), is not known.

Therefore, a main object of the present invention is to provide an optical product having a film that has a minutely uneven structure formed by a material other than aluminium or a compound thereof.

Furthermore, another main object of the present invention is to provide an optical product manufacturing method capable of easily manufacturing an optical product having a film that has a minutely uneven structure formed by a material other than aluminium or a compound thereof.

SUMMARY OF THE INVENTION

In order to achieve the above-described object, an optical product including: a base; and an optical film formed directly or indirectly on a film-formation surface of the base is provided, and the optical film has an $Al_2O_3$ layer that is made of $Al_2O_3$ and is disposed on the base side, and an $SiO_2$ layer that is made of $SiO_2$ and that has a minutely uneven structure.

Furthermore, in order to achieve the above-described object, an optical product manufacturing method including: forming, on a base, an aluminum-based manufacture intermediate film made of aluminium, an aluminium alloy, or an aluminium compound; and immersing the base having the aluminum-based manufacture intermediate film in an aqueous solution of silica, is provided. In the optical product manufacturing method, the silica in the aqueous solution has a concentration of not greater than 10 mg/l.

A main effect of the present invention is to provide an optical product having a film that has a minutely uneven structure formed by a material other than aluminium or a compound thereof.

Furthermore, another main effect of the present invention is to provide an optical product manufacturing method capable of easily manufacturing an optical product having a film that has a minutely uneven structure formed by a material other than aluminium or a compound thereof.

DETAILED DESCRIPTION OF THE INVENTION

An exemplary embodiment of the present invention will be described below with appropriate reference to the drawings.

The present invention is not limited to the following exemplary embodiment.

Figure 1:
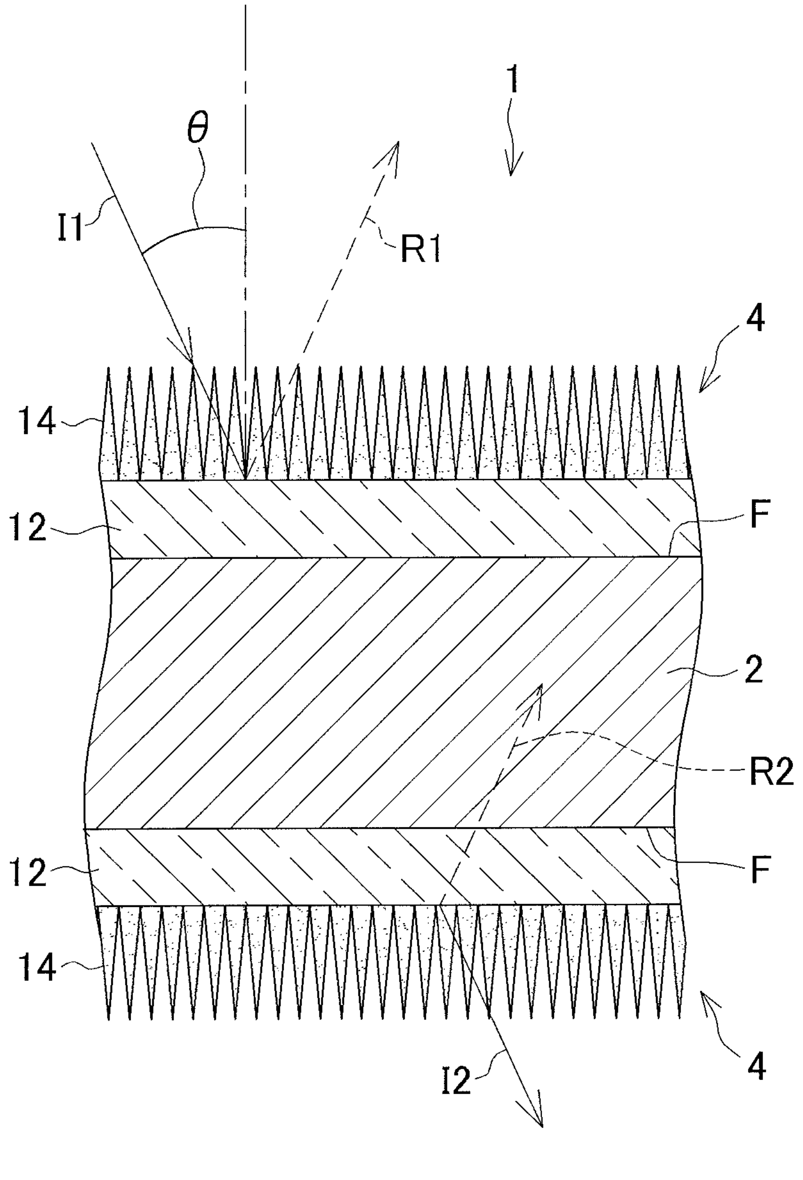
FIG. 1 is a schematic cross-sectional view of an optical product according to the present invention.

As shown in FIG. 1, an optical product 1 of the present invention includes a base 2, and an optical film 4 formed on a film-formation surface F of the base 2. In the drawings, a thickness of the optical film 4 is exaggerated relative to the thickness of the base 2.

The optical product 1 is used as an antireflection member having translucency. That is, in the optical product 1, the optical film 4 allows an intensity of reflected light R1 to be reduced relative to an intensity of incident light I1 (incidence angle θ) incident on the optical product 1.

FIG. 1 collectively shows transmitted light 12 as light obtained by transmitting the incident light I1 at an opposite surface opposing an incident surface, and reflected light R2 as light obtained by reflecting the incident light I1 at the surface. The optical product 1 may be used as a member other than an antireflection member.

The base 2 is a base for forming the optical product 1, and is plate-shaped (substrate) in the description herein. The base 2 is translucent, and the transmittance of visible light as light having a wavelength in a visible range (not less than 400 nm and not greater than 750 nm in the present invention) in the base 2 is almost 100%. The shape of the base 2 may be a flat-plate-like shape or curved-plate-like shape, or may be a non-plate-like shape such as a block-like shape.

As a material (material substance) of the base 2, plastic is used, and polycarbonate resin (hereinafter referred to as PC) as thermosetting resin is used in the description herein. The material of the base 2 is not limited to PC, and examples of the material may include polyurethane resin, thiourethane resin, episulfide resin, polyester resin, acrylic resin, polyether sulfone resin, poly(4-methylpentene-1) resin, diethylene glycol bis(allyl carbonate) resin, and a combination thereof. Furthermore, the material of the base 2 may be a material such as glass other than plastic.

The film-formation surface F of the base 2 is disposed on each of a front surface and a rear surface. The optical film 4 is disposed directly on each of the front surface and the rear surface. The optical film 4 may be disposed on one of the front surface and the rear surface, or may be disposed on three or more surfaces of the block-shaped base 2 or the like. An intermediate film such as a hard coating film may be disposed between the base 2 and at least one of the optical films 4. In a case where such an intermediate film is disposed, the optical film 4 is formed indirectly on the base 2.

The optical film 4 on the rear surface has the same structure as the optical film 4 on the front surface. Hereinafter, the optical film 4 on the front surface will be described, and description of the optical film 4 on the rear surface is omitted as appropriate.

The optical film 4 has an $Al_2O_3$ layer 12 made of alumina, on the first layer counting from the base 2 (the same counting manner is applied to the following description), and has an $SiO_2$ layer 14 that is made of silica and that has a minutely uneven structure, on the second layer.

Alternatively, the optical film 4 has an $Al_2O_3$ layer that is a layer containing $Al_2O_3$ as a main component, on the first layer, and has an $SiO_2$ layer 14 that is a layer containing $SiO_2$ as a main component and that has a minutely uneven structure, on the second layer. In this case, a boundary between the first layer and the second layer may be unclear. Furthermore, typically, a component ratio of $Al_2O_3$ becomes higher in a portion closer to the base 2, and a component ratio of $SiO_2$ to $Al_2O_3$ becomes higher in a portion farther from the base 2, in the first layer. That is, in the film thickness direction, a component ratio of $SiO_2$ to $Al_2O_3$ in the first layer is proportional to a distance from the base 2. The first layer can be obtained as a thin-film-like layer having no minutely uneven structure regardless of distribution of the materials. Furthermore, the first layer can be obtained as a base portion (bed) of the minutely uneven structure. Moreover, the first layer can be obtained as a thin-film-like layer which has no minutely uneven structure and in which the material gradually changes in the layer. Furthermore, the second layer can contain $Al_2O_3$ in a state where the $Al_2O_3$ does not become a main component. For example, the second layer can have a core (skeleton), of the minutely uneven structure, which contains $Al_2O_3$ as a main component, and a coating which contains, as a main component, $SiO_2$ covering a part or the entirety of the core. The second layer can be obtained as a layer having a minutely uneven structure regardless of distribution of the materials.

The height of the $SiO_2$ layer 14 is, for example, not less than about 1 nm and not greater than about 1000 nm. The minutely uneven structure in the $SiO_2$ layer 14 is, for example, a fluff-like structure, a multiple-pyramids-shaped structure, a flower-frog-shaped structure, or a combination thereof.

Figure 2:
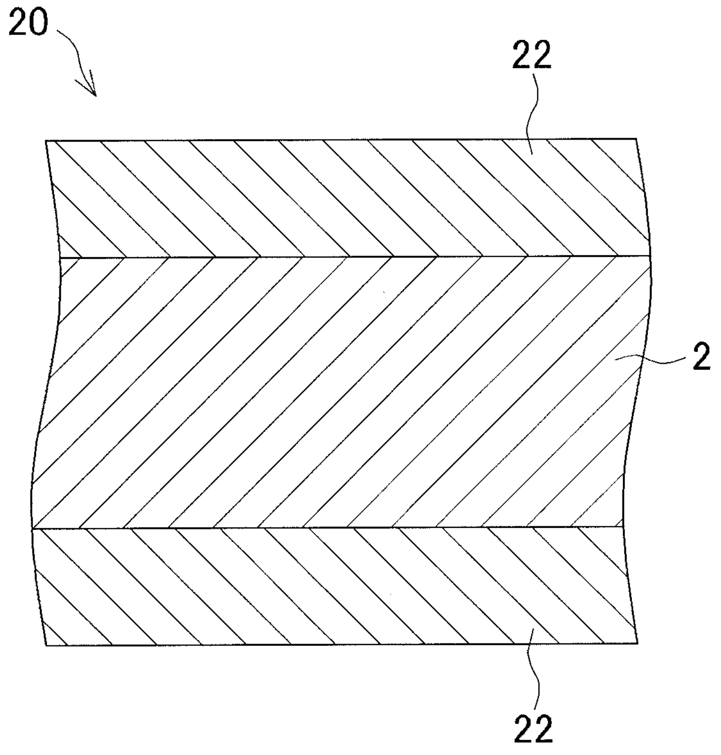
FIG. 2 is a schematic cross-sectional view of a manufacture intermediate for the optical product in FIG. 1.

The optical product 1 is manufactured from a manufacture intermediate 20 shown in FIG. 2. The manufacture intermediate 20 includes the base 2, and an aluminium-based (hereinafter referred to as Al-based) manufacture intermediate film 22 formed on each of the film-formation surfaces F.

Each Al-based manufacture intermediate film 22 is formed of aluminium nitride (AlN) in the description herein. In AlN, an element ratio between Al and N may be any ratio as long as the existence thereof is stable.

A material (material substance) of at least one of the Al-based manufacture intermediate films 22 may be aluminium, an aluminium alloy, or an aluminium compound other than AlN, and may be, for example, Al, $Al_2O_3$, aluminium oxynitride (AON), or a combination of at least two selected from the group including Al, $Al_2O_3$, AlON, and AlN. In AlON, an element ratio between Al and N, an element ratio between Al and O, and an element ratio between O and N are also similar to the ratio in AlN. In a case where a plurality of the Al-based manufacture intermediate films 22 are disposed, a material of a part of the Al-based manufacture intermediate films 22 may be different from a material of the other of the Al-based manufacture intermediate films 22.

The aluminium alloy and the aluminium compound may be an alloy and a compound each containing aluminium as a main component. In the description herein, the main component may be a component having a weight ratio greater than half the entire weight ratio, a component having a volume ratio greater than half the entire volume ratio, or a component having an element ratio greater than half the entire element ratio, relative to the other components. Such a matter for the main component also applies, as appropriate, to members other than the Al-based manufacture intermediate film 22.

FIGS. 3A to 3F is a schematic diagram illustrating a method for manufacturing the optical product 1. In FIGS. 3A to 3F, for simplifying the description, the film-formation surface F is disposed only at one surface.

Figures 3A, 3B, 3C, 3D, 3E, 3F:
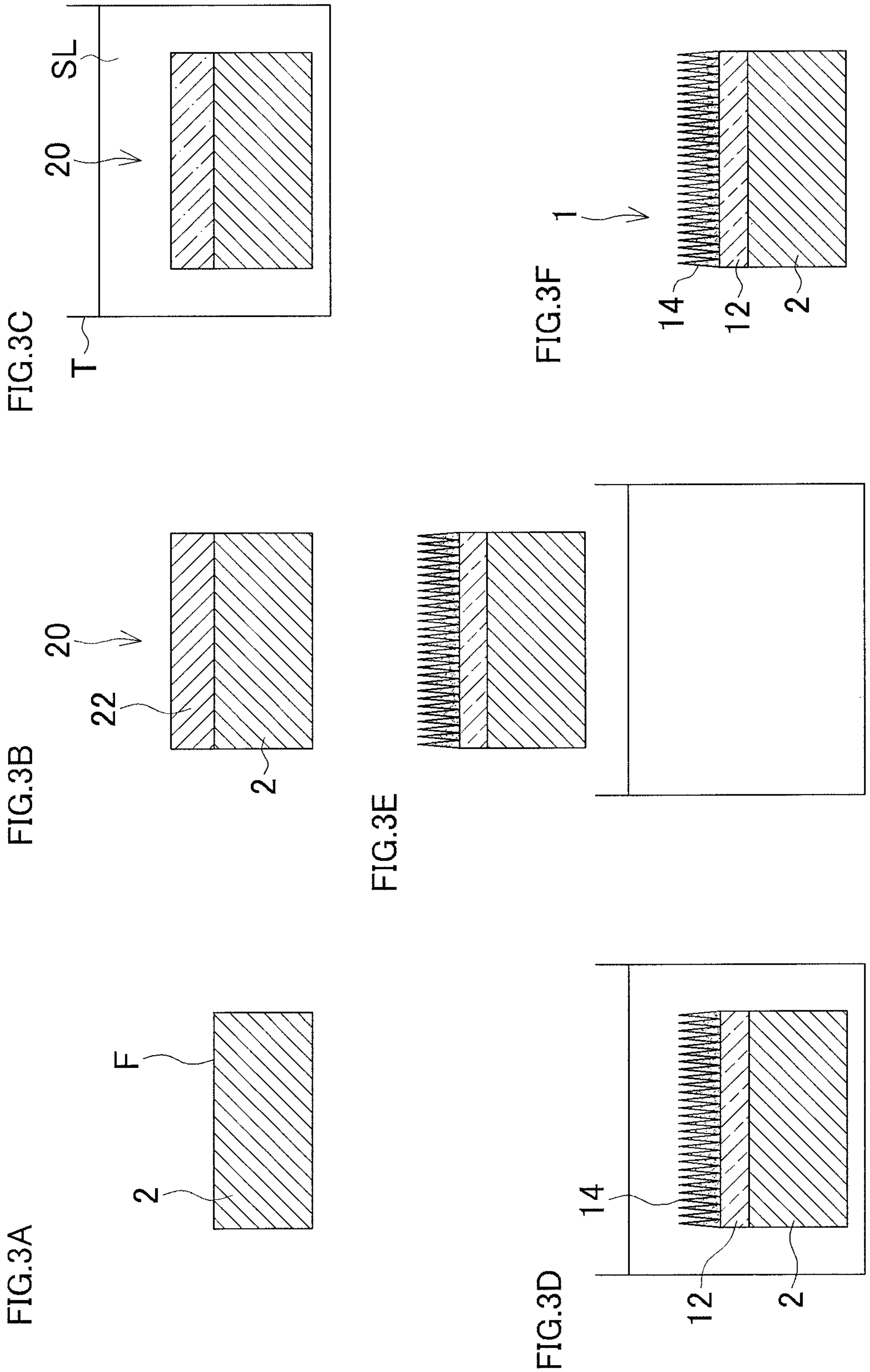
FIGS. 3A to 3F are each a schematic diagram illustrating a method for manufacturing the optical product in FIG. 1.

As shown in FIG. 3B, the Al-based manufacture intermediate film 22 is formed on the film-formation surface F of the base 2 shown in FIG. 3A. The Al-based manufacture intermediate film 22 is formed directly on the base 2 through physical vapor deposition (PVD, vacuum deposition, sputtering, and the like). In a case where the Al-based manufacture intermediate films 22 are formed on both surfaces of the base 2, the optical films 4 are formed on both surfaces of the base 2.

A case where the Al-based manufacture intermediate film 22 made of AlN is formed through DC sputtering by a DC sputter deposition apparatus, will be described below.

That is, firstly, a plate-shaped target made of Al is set, a film forming chamber is evacuated, and cleaning of the base 2 is performed as a pretreatment by supplying oxygen ($O_2$) gas that has become radical oxygen through application of high frequency voltage, at a predetermined flow rate (for example, 500 ccm), for a predetermined time period (for example, 30 seconds), from a radical source to the film forming chamber. More specifically, through such application of radical oxygen, even if an organic substance and the like are adhered to the base 2, the organic substance and the like are decomposed and separated by ultraviolet rays generated by the radical oxygen and plasma. Such cleaning enhances adherence of a film formed later.

Sputtering is performed for the Al-based manufacture intermediate film 22 in a predetermined process condition. In the description herein, an Al sputtering source operates in conjunction with introduction of argon (Ar) gas, and nitrogen ($N_2$) gas is introduced as the radical source into the film forming chamber. Instead of the sputtering source or together with the sputtering source, Ar gas may be introduced for the radical source. For Ar gas, rare gas other than Ar may be used. Such change about Ar gas may be performed as appropriate for the other film forming.

The Al-based manufacture intermediate film 22 made of $Al_2O_3$ or the like may be formed through vapor deposition.

In vapor deposition for the Al-based manufacture intermediate film 22 made of Al, Al granules may be heated by electron beams (hereinafter referred to as EB) in a film forming chamber in a vacuum state.

In vapor deposition for the Al-based manufacture intermediate film 22 made of $Al_2O_3$, $O_2$ gas may be introduced, and Al granules may be heated by EB in a film forming chamber in a vacuum state.

The base 2 having the Al-based manufacture intermediate film 22 as configured above, that is, the manufacture intermediate 20, is immersed in a solution SL in a tank T, as shown in FIG. 3C.

The solution SL is a solution in which a small amount of silica ($SiO_2$) is dissolved in water ($H_2O$). In other words, the solution SL is an aqueous solution of a small amount of silica.

Thus, as shown in FIG. 3D, the Al-based manufacture intermediate film 22 allows the $SiO_2$ layer 14 having a minutely uneven structure to be generated on the side opposite to the base 2 side while changing to the $Al_2O_3$ layer 12. That is, the Al-based manufacture intermediate film 22 becomes the $Al_2O_3$ layer 12 and the $SiO_2$ layer 14.

More specifically, the Al-based manufacture intermediate film 22 gradually adsorbs a small amount of $SiO_2$ in the solution SL on the side opposite to the base 2 side, and collects $SiO_2$ so as to have the minutely uneven structure while changing to the $Al_2O_3$ layer 12 through reaction involving partial dissolution with water in the solution SL. The Al-based manufacture intermediate film 22 allows, for example, multiple minute fluff-like, pyramidal, conic, or needle-shaped objects which are made of $SiO_2$, to grow in the film thickness direction in the solution SL. The orientation (direction) of the manufacture intermediate 20 in the immersed state is not limited to the horizontal orientation as shown in FIG. 3. The number of the manufacture intermediates 20 which are simultaneously immersed may be plural.

The concentration of $SiO_2$ in the solution SL is, for example, not greater than 10 mg/l and more preferably not greater than 2 mg/l, mainly from the viewpoint of advantageously forming the $SiO_2$ layer 14.

The temperature of the solution SL is 90° C. from the viewpoint of obtaining the fluff-like structure or the like in the shortest possible time period, in the description herein. Furthermore, the temperature of the solution SL is, for example, not lower than 80° C. and not higher than 100° C., or not lower than 90° C. and not higher than 100° C. In order to obtain a temperature of not lower than 100° C., water needs to be subjected to a special treatment such as pressure application, or a substance other than water needs to be used, so that the process becomes bothersome.

A time of immersion in the solution SL is, for example, not shorter than two seconds and not longer than ten minutes, not shorter than five seconds and not longer than five minutes, or not shorter than 15 seconds and not longer than three minutes, from the viewpoint of obtaining the $Al_2O_3$ layer 12 and the $SiO_2$ layer 14 in the shortest possible time period. If the immersion time is short, the $Al_2O_3$ layer 12 and the $SiO_2$ layer 14 are not sufficiently formed. If the immersion time is long, the efficiency becomes low according to the treatment time becoming long.

Thereafter, as shown in FIG. 3E, the base 2 having the $Al_2O_3$ layer 12 and the $SiO_2$ layer 14 is taken out from the tank T and dried, whereby the optical product 1 is completed as shown in FIG. 3F.

Next, preferable examples of the present invention and a comparative example which does not belong to the present invention will be described.

The present invention is not limited to the following examples. According to the interpretation of the present invention, the following examples may be substantially construed as the comparative examples or the following comparative example may be substantially construed as the example.

Examples 1 is described below.

Example 1 corresponds to the above-described embodiment.

In Example 1, the Al-based manufacture intermediate film 22 made of AlN was formed on both surfaces of the plate-shaped base 2 made of PC by DC sputtering in a process condition indicated at the top line excluding the line for column headings in the following Table 1, so as to have a physical film thickness of 72 nm.

The manufacture intermediate 20 was immersed in the solution SL having a temperature of 90° C. and containing 0.06 mg/l of silica for three minutes, and dried, to obtain the optical product 1 according to Example 1.

Particularly, the concentration of silica in the solution SL was obtained as follows. That is, the concentration of silica in the solution SL was measured by PACKTEST silica (low concentration) manufactured by KYORITSU CHEMICAL-CHECK Lab., Corp. based on a blue coloring mechanism in molybdenum blue absorption spectroscopy. The PACK-TEST silica (low concentration) allows the concentration of silica in a sample to be measured within a range of 0.5 to 20 mg/l. In a case where the concentration of silica was lower than 0.5 mg/I, a solvent ($H_2O$) in the solution SL taken as a sample was heated and evaporated to perform concentration, a reduced amount of a volume for the concentrated solution was measured, the concentration of silica in the concentrated solution was measured, and the concentration of silica in the solution SL for the sample having not been concentrated yet was obtained through calculation in which, for the measured concentration, the reduced amount of the volume for the solvent was taken into consideration.

TABLE 1

| Material | Method | Form of material | Film forming condition | Compound reaction mode |
|---|---|---|---|---|
| AlN | DC sputtering | plate-shaped target | discharge output: 4 kW | Al film was formed while nitrogen radical was applied |
| $Al_2O_3$ | DC sputtering | plate-shaped target | discharge output: 4 kW | Al film was formed while oxygen radical was applied |
| AlON | DC sputtering | plate-shaped target | discharge output: 4 kW | Film was formed while oxygen radical and nitrogen radical were applied |
| Al | DC sputtering | plate-shaped target | discharge output: 4 kW | unused |
| Al | vacuum deposition | particles | EB heating: 7 kV 200 mA | unused |
| $Al_2O_3$ | vacuum deposition | granules | EB heating: 7 kV 200 mA | Film was formed while oxygen was introduced |

Figure 4:
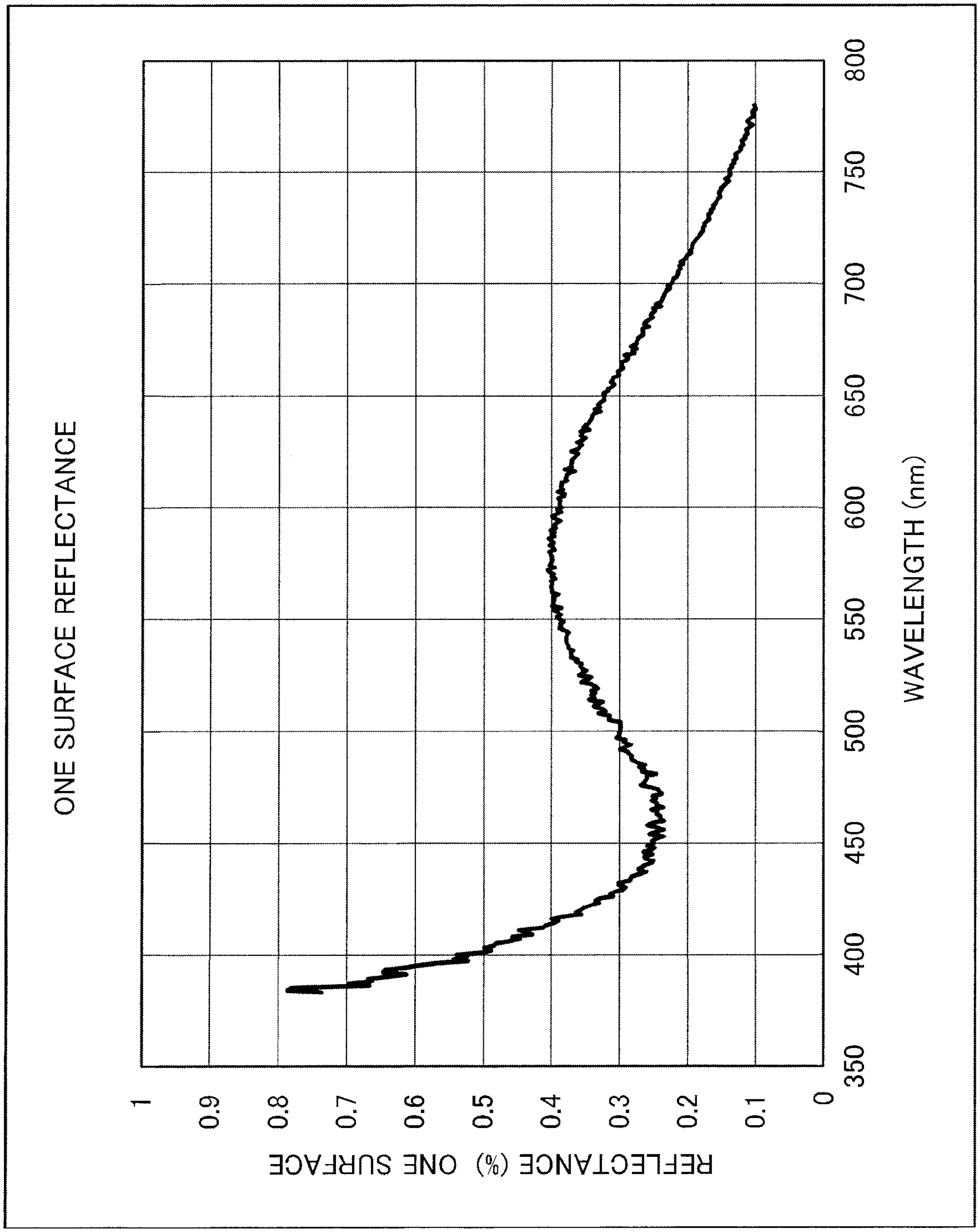
FIG. 4 shows a graph for one surface reflectance in perpendicular incidence in Example 1.

FIG. 4 shows a graph of one surface reflectance of light incident so as to be perpendicular (at an incidence angle θ=0°) to the film-formation surface F of the base 2, in a visible range and an adjacent range, according to Example 1.

Figure 5:
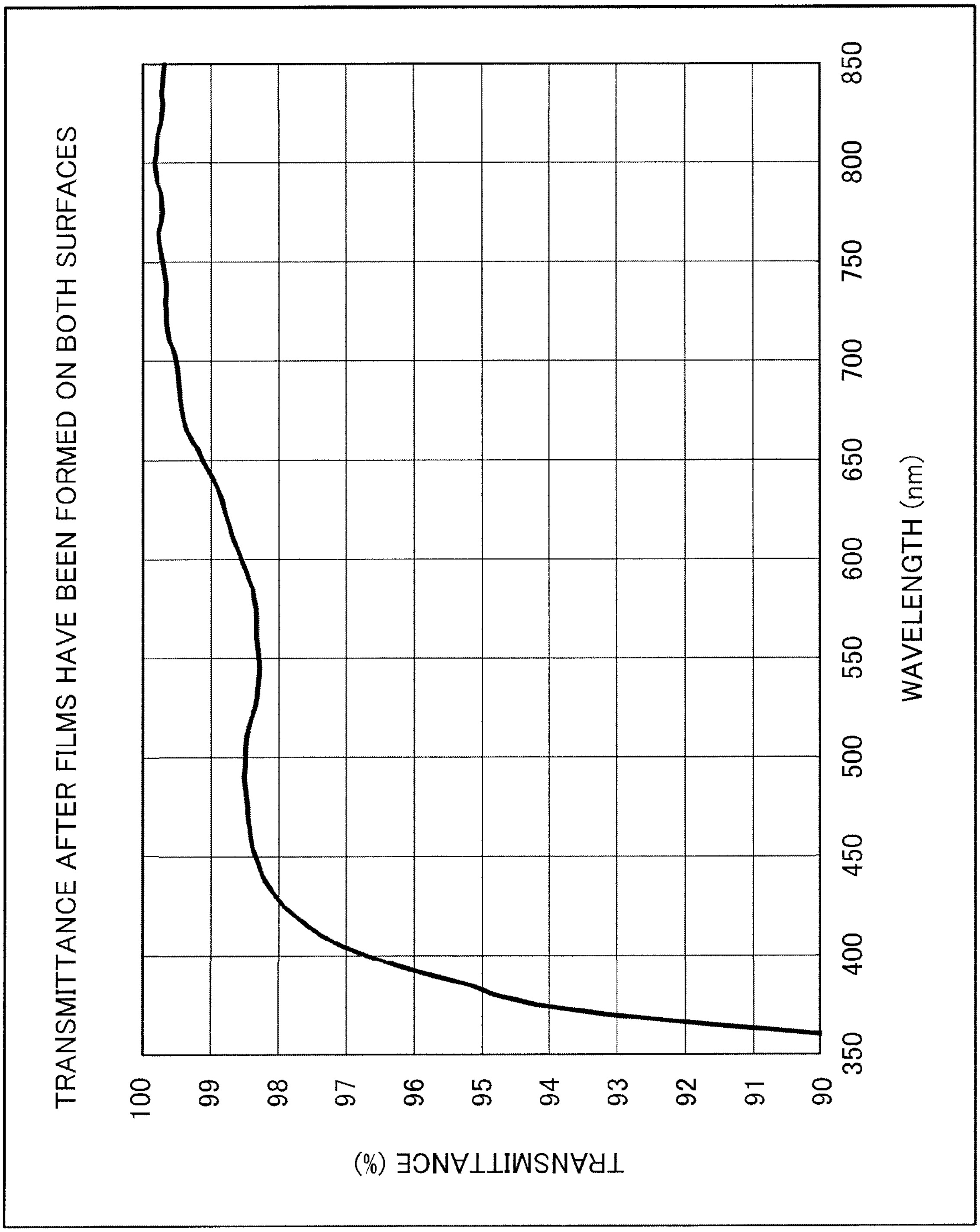
FIG. 5 shows a graph for transmittance in perpendicular incidence in Example 1.

FIG. 5 shows a graph of transmittance (a ratio of an intensity of the transmitted light 12 transmitted through the optical film 4 on the front surface, the base 2, and the optical film 4 on the rear surface, relative to an intensity of the incident light I1) of light incident so as to be perpendicular to the film-formation surface F of the base 2, in a visible range and an adjacent range, according to Example 1. In other words, FIG. 5 shows a ratio of an intensity of the transmitted light 12 transmitted through the optical film 4 on the front surface, the base 2, and the optical film 4 on the rear surface, relative to an intensity of the incident light I1).

The graphs indicate that, in Example 1, low reflection (for example, not greater than 1% over the entire visible range) was realized for visible light.

Figure 6:
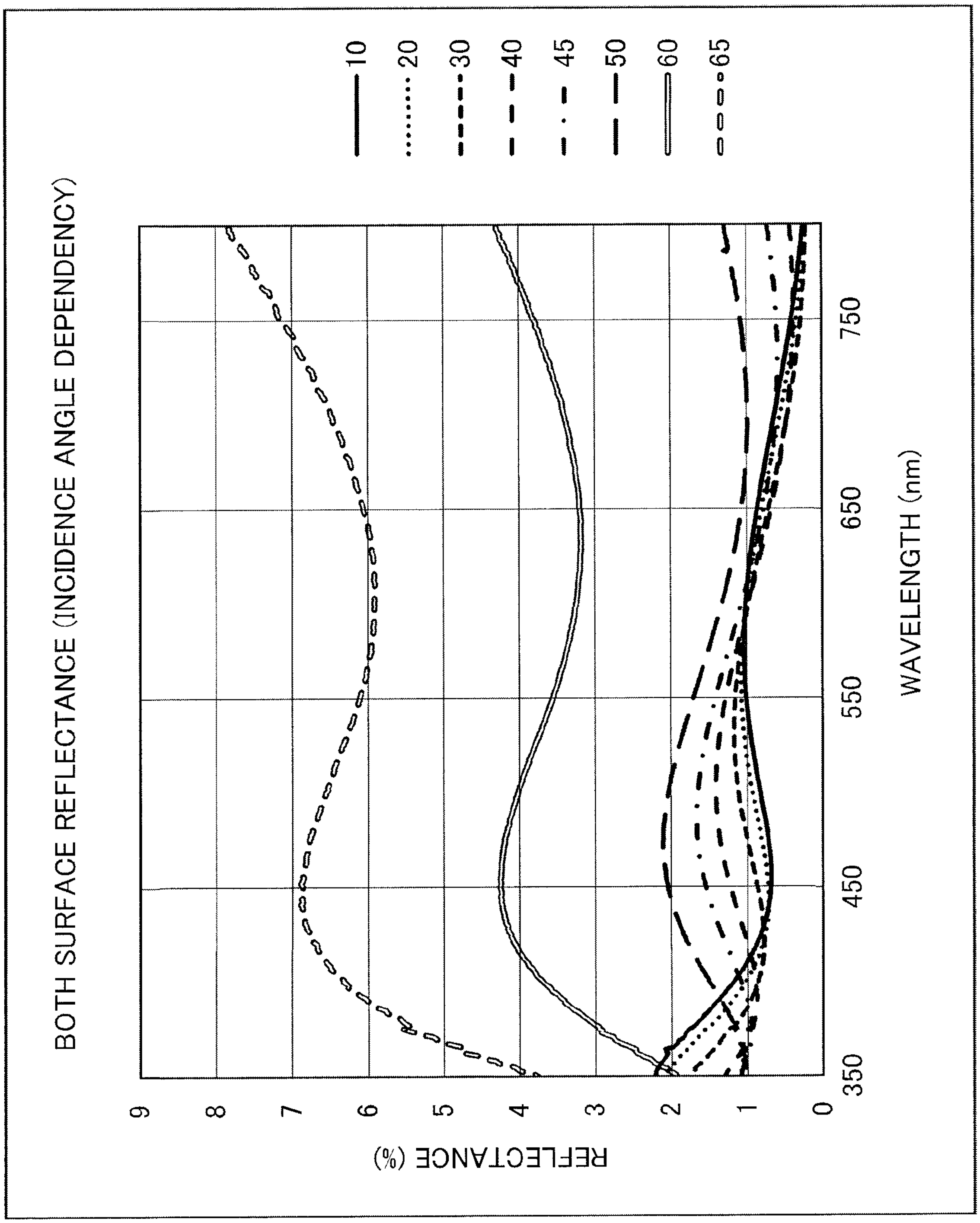
FIG. 6 shows a graph of both surface reflectance of light at various incidence angles θ in Example 1.

FIG. 6 shows a graph of both surface reflectance (mainly, a ratio of the total intensity of the reflected light R1 and the reflected light R2 to an intensity of the incident light I1) of light in a visible range and an adjacent range in the case of an incidence angle θ with respect to the film-formation surface F of the base 2 being varied, according to Example 1.

Figure 7:
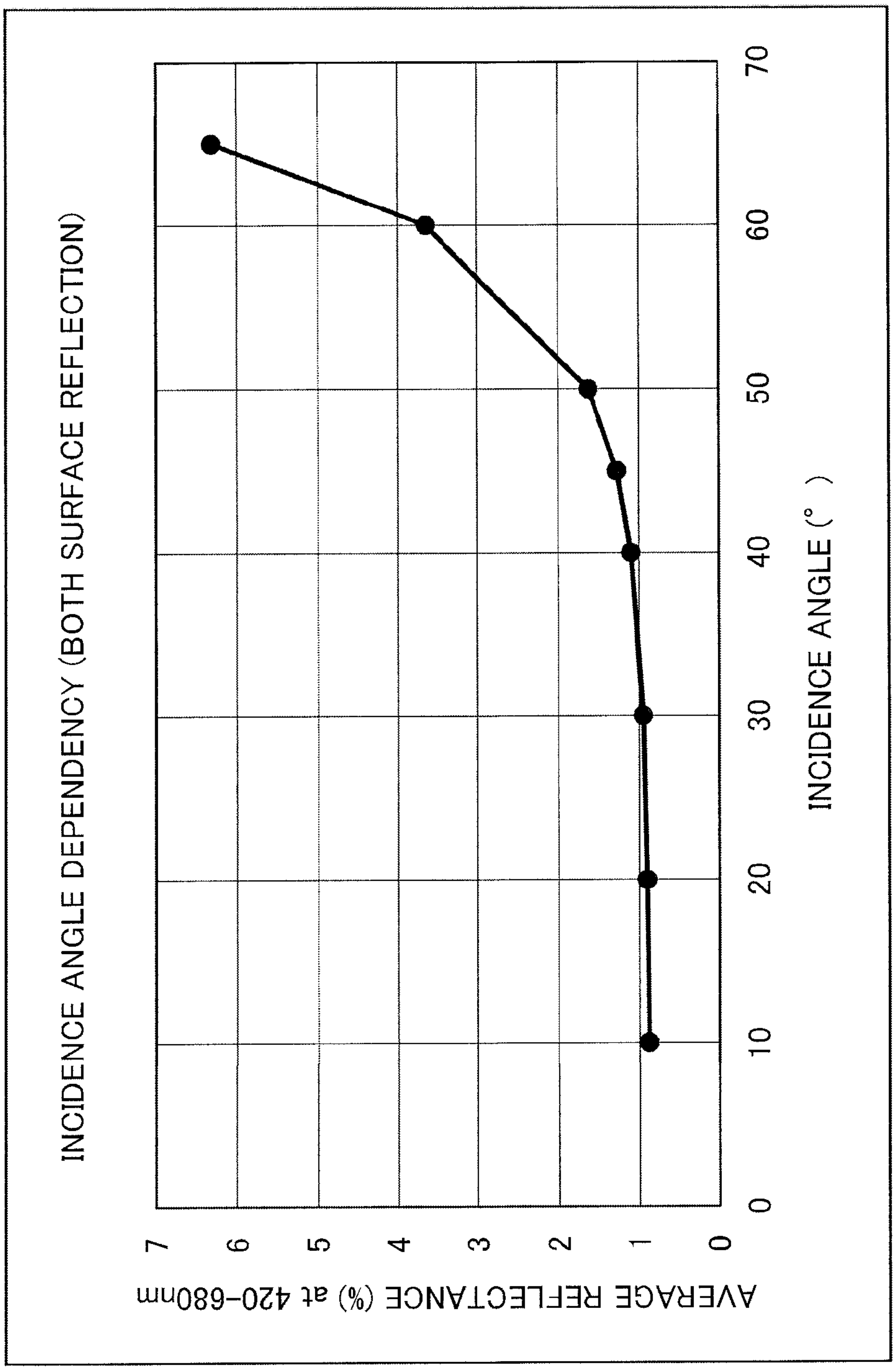
FIG. 7 shows a graph for incidence angle dependency of both surface reflectance in Example 1.

FIG. 7 shows a graph representing incidence angle dependency of both surface reflectance, in which the horizontal axis represents an incidence angle θ and the vertical axis represents an average reflectance in a specific range in a visible range. In the description herein, the specific range is a range of not less than 420 nm and not greater than 680 nm. In the following description, all of the various average reflectances were calculated in this specific range.

These graphs indicate that, in Example 1, low reflection (for example, not greater than 2% over the entire visible range) was realized to almost the same degree as in perpendicular incidence, up to the incidence angle θ=45°, and low reflection was realized to such a degree that the average reflectance in the visible range was not greater than 2% also at the incidence angle θ=50°. That is, the low reflection in Example 1 was realized in a wide range of incidence angles θ (characteristics of moth-eye structure), and incidence angle dependency of low reflection in Example 1 can be said to be low in a range of not less than 0° and not greater than 50°.

Furthermore, a structure and a component of the optical film 4 of Example 1 were observed in the following procedure.

That is, the optical film 4 was formed on one surface of a substrate made of PC in the same manufacturing method as in Example 1, and the optical film 4 on the substrate was cut by gallium (Ga) beams into such a size as to be stored in a sample holder made of copper (FIB (focused ion beam) process). The substrate having the optical film 4 was stored in the sample holder, and the cut substrate having the optical film 4 was covered with a carbon protective film in order to retain the structure of the optical film 4, to produce an observation target.

The observation target was observed by using a transmission electron microscope (TEM), and characteristic X-rays were applied to the observation target to analyze elements of the optical film 4.

Figure 8:
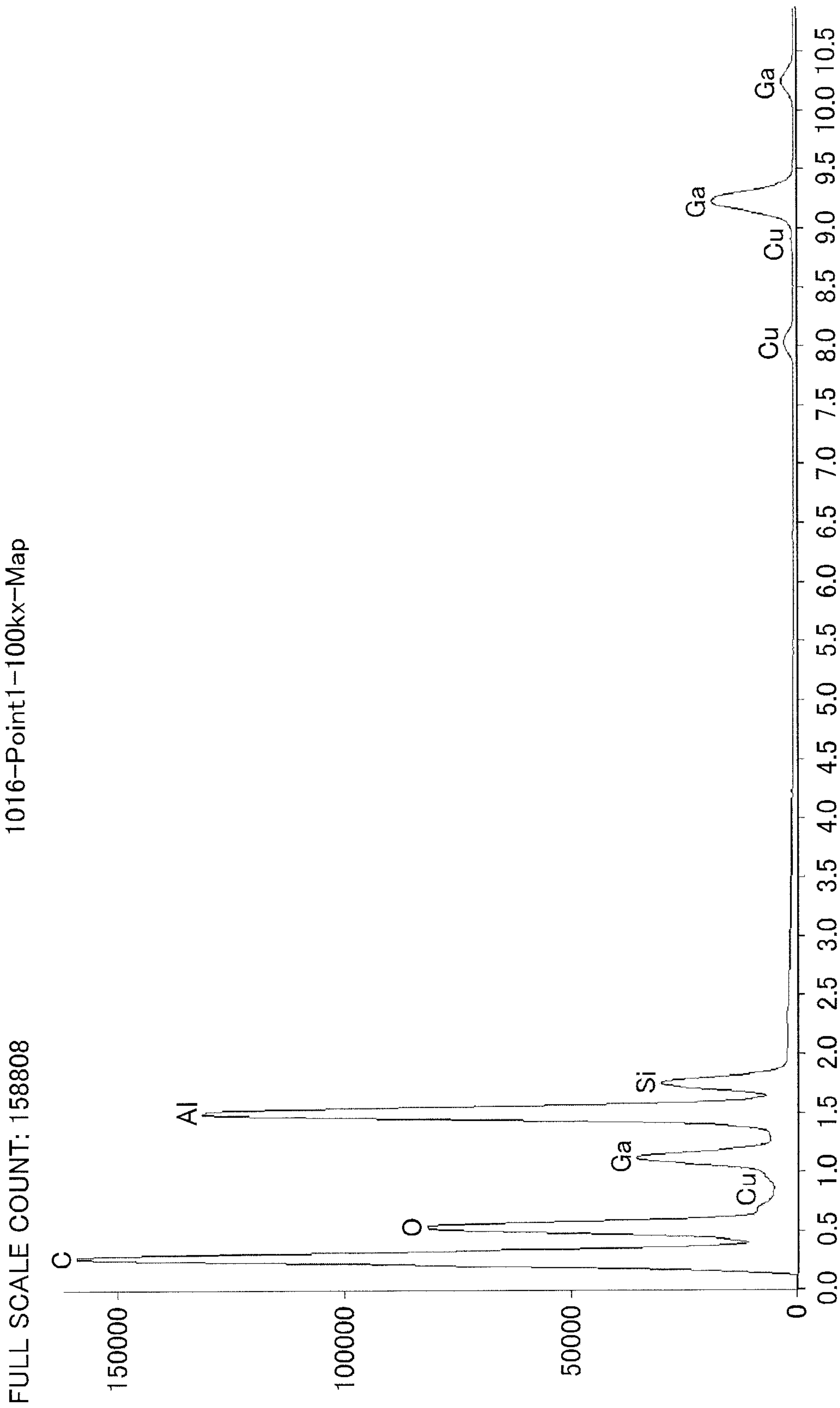
FIG. 8 shows a graph of a spectrum for characteristic X rays in an observation target similar to that in Example 1.

FIG. 8 shows a graph of a spectrum by characteristic X-rays.

FIG. 8 indicates that the observation target contained carbon atom (C), oxygen atom (O), copper atom (Cu), gallium atom (Ga), aluminium atom (Al), and silicon atom (Si).

Among them, Cu was derived from the sample holder. Ga was derived from FIB process. Furthermore, C was derived from the protective film. Therefore, the optical film 4 contained O, Al, and Si.

Figure 9:
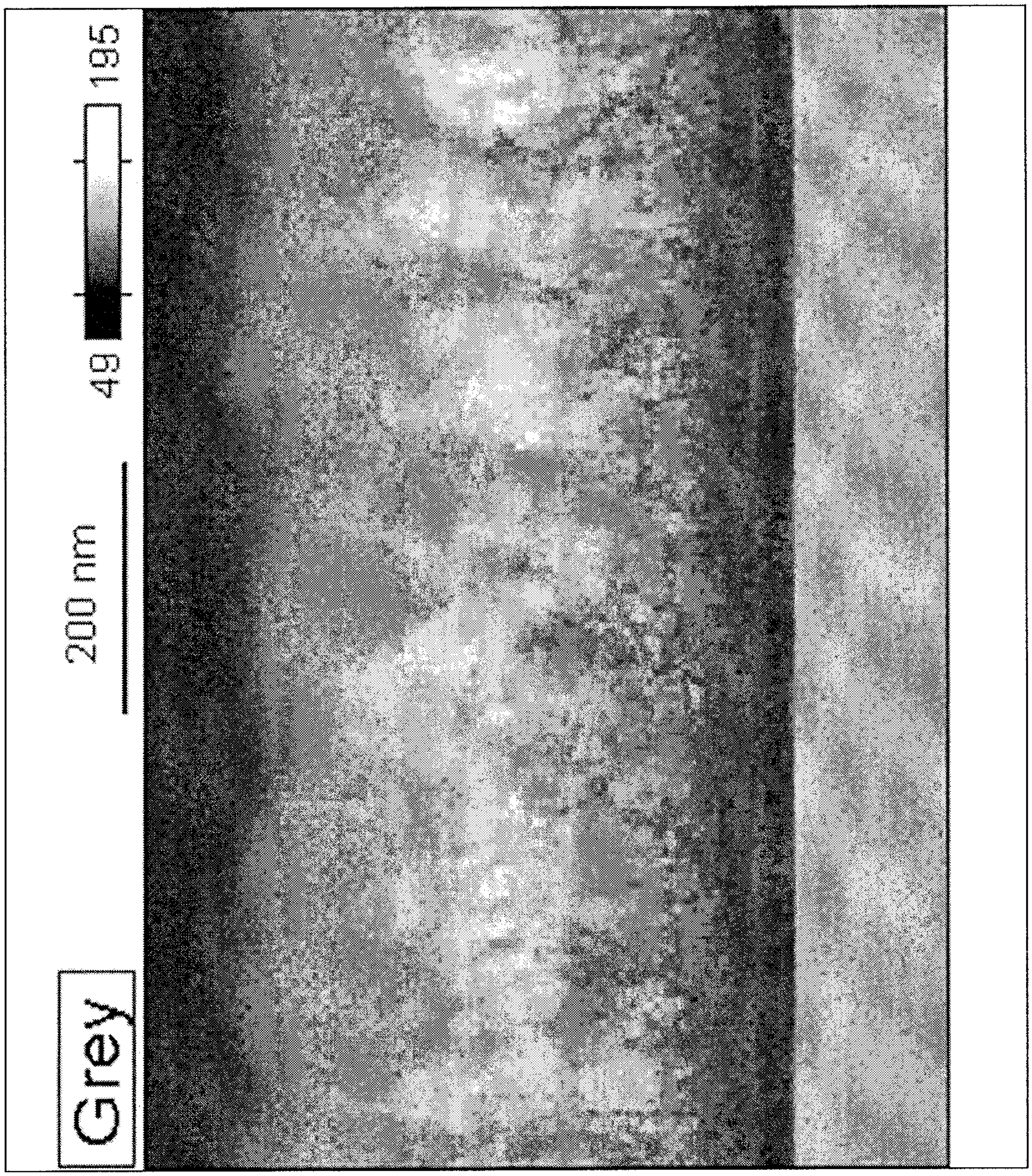
FIG. 9 shows an observed image by TEM for the observation target in FIG. 8.
Figure 10:
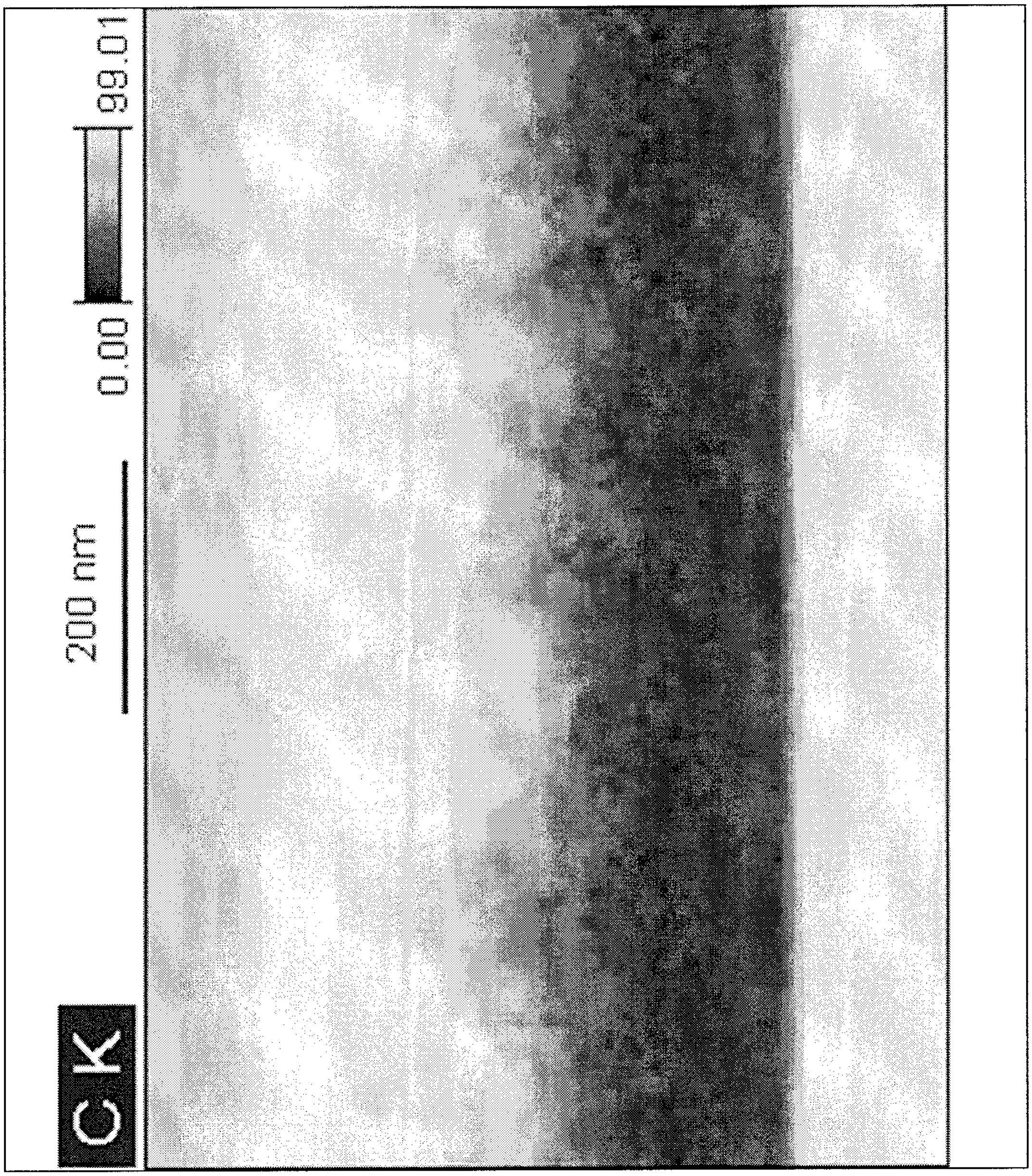
FIG. 10 shows a C—Kα ray overlap image for the observation target in FIG. 8.
Figure 11:
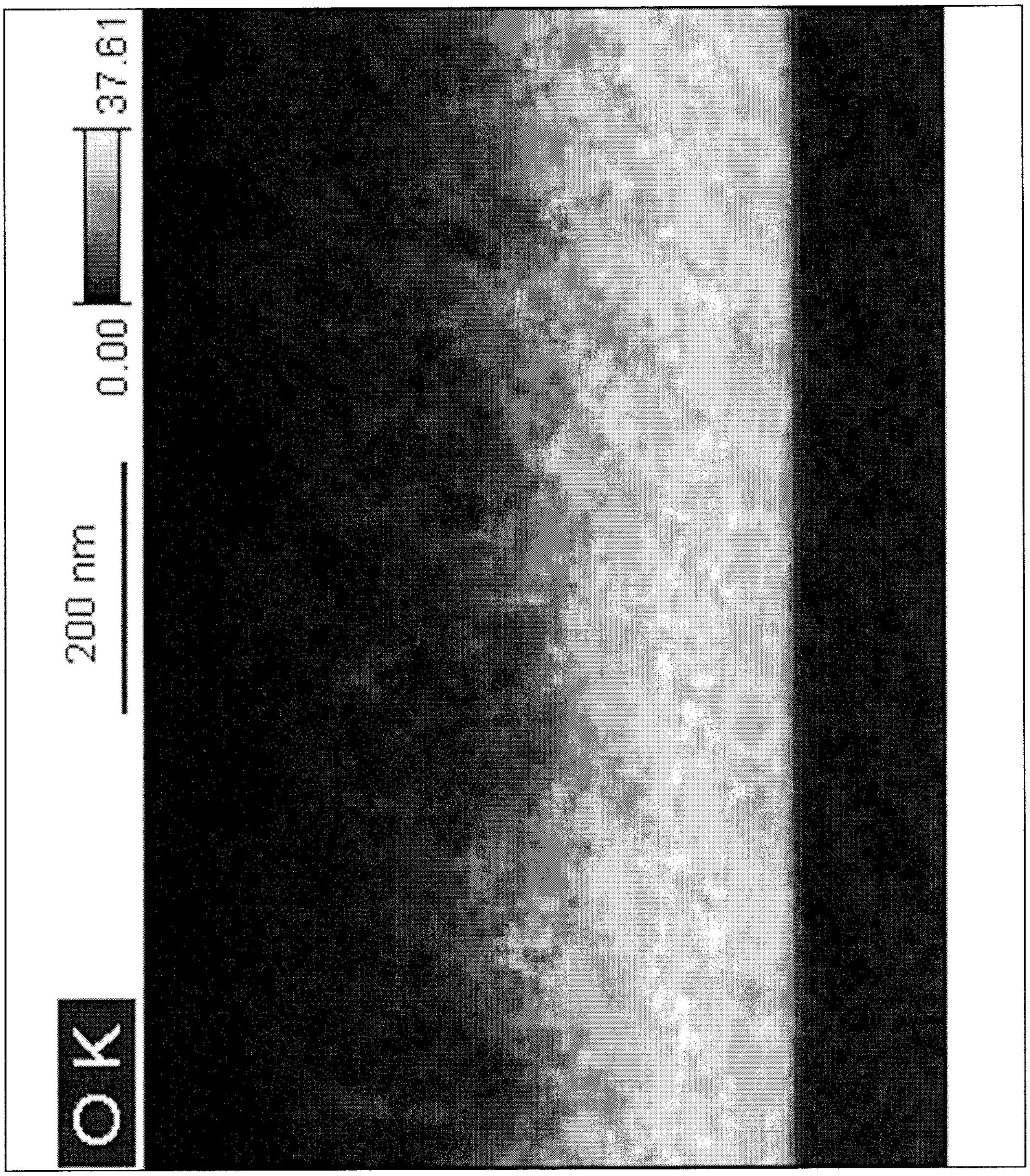
FIG. 11 shows an O—Kα ray overlap image for the observation target in FIG. 8.
Figure 12:
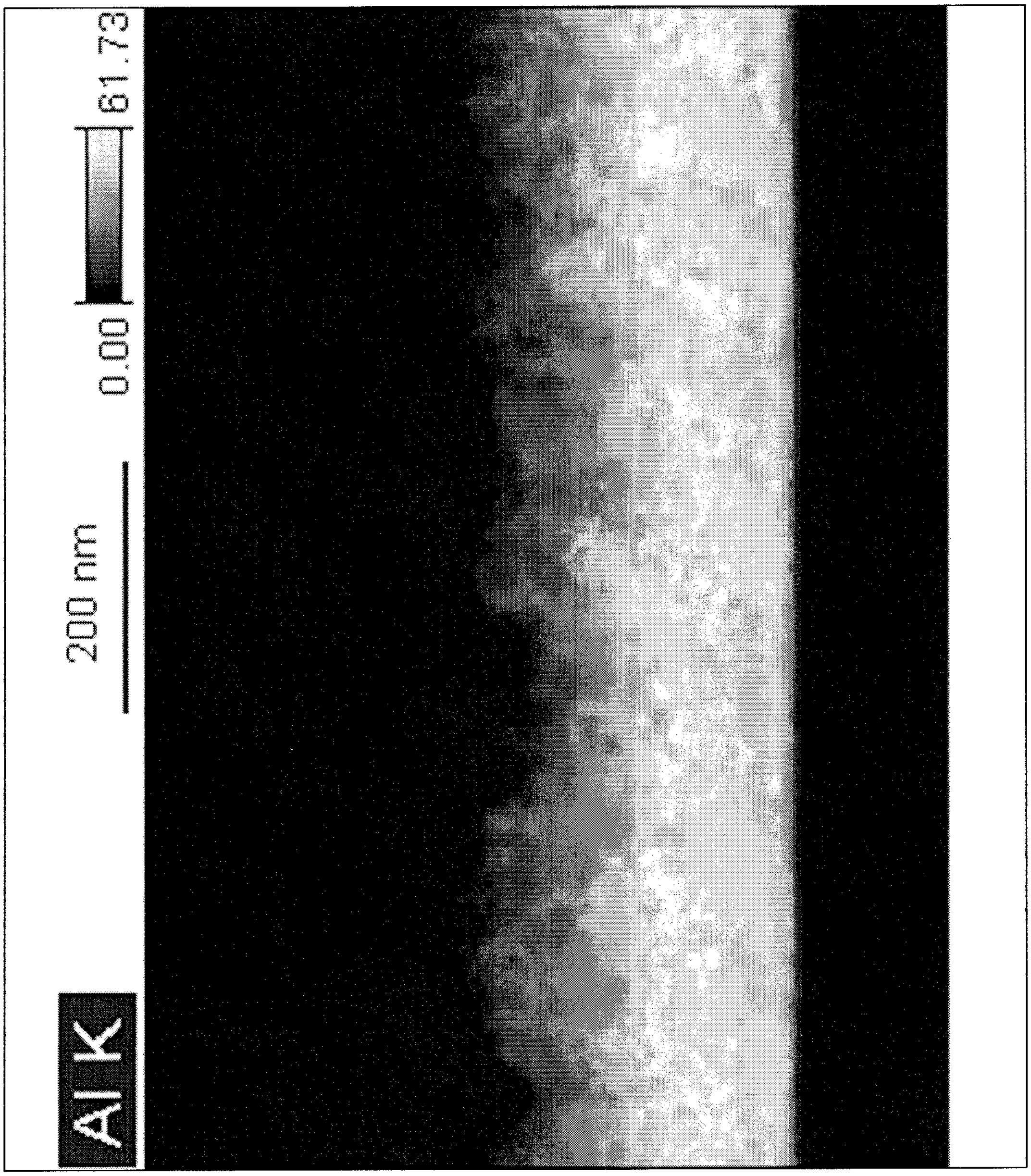
FIG. 12 shows an Al—Kα ray overlap image for the observation target in FIG. 8.
Figure 13:
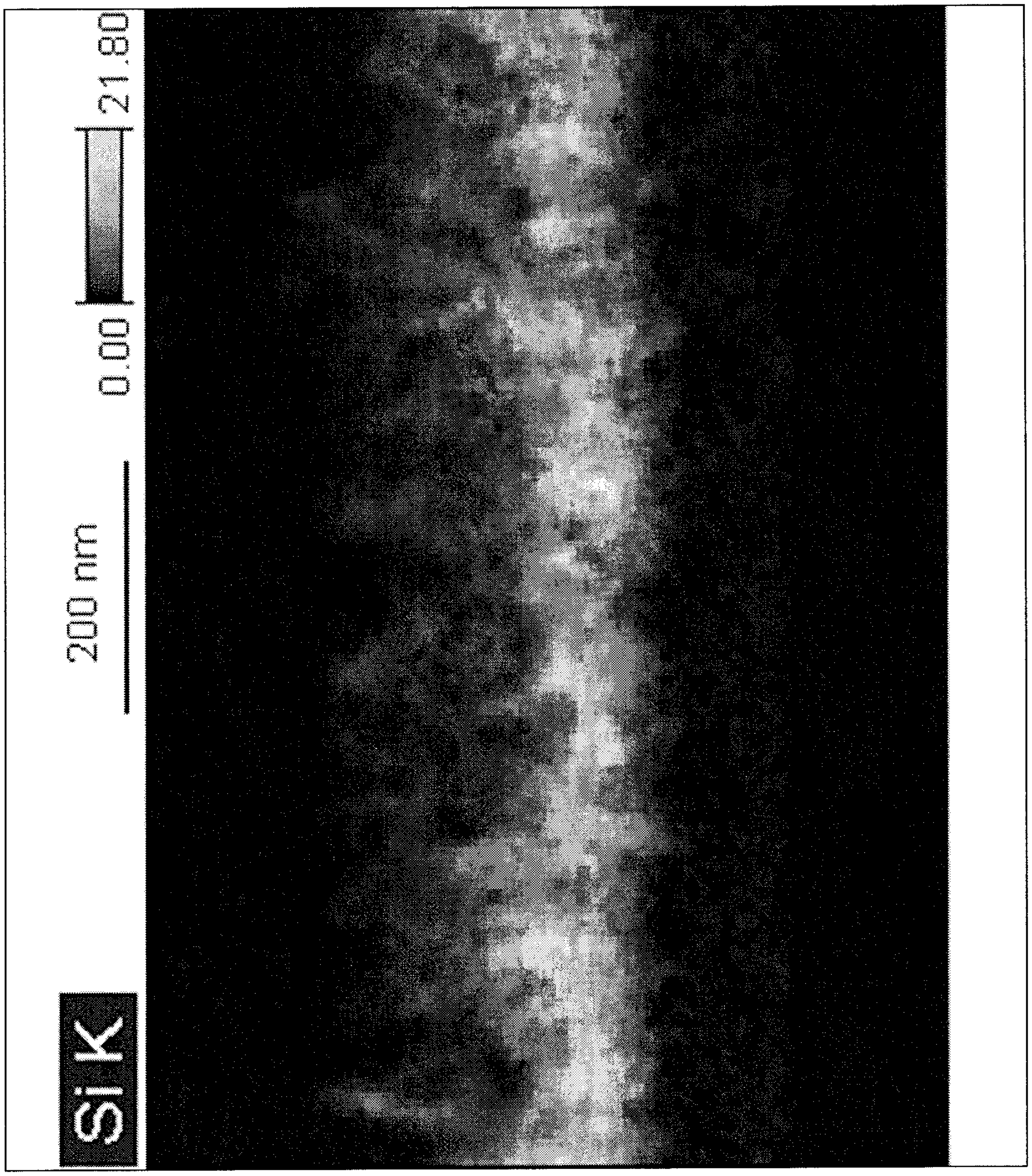
FIG. 13 shows an Si—Kα ray overlap image for the observation target in FIG. 8.

FIG. 9 shows an observed image by the TEM. FIG. 10 shows an image (C—Kα rays overlap image) in which the pixel concentration is proportionally enhanced such that the higher the intensity at the position of a pixel is, the higher the concentration of the pixel is, according to the distribution of the intensity of Kα rays of C, in the observation range in FIG. 9. FIG. 11 shows an O—Kα rays overlap image, for Kα rays of O. FIG. 12 shows an Al—Kα rays overlap image, for Kα rays of Al. FIG. 13 shows aSi-Kα rays overlap image, for Kα rays of Si. These figures indicate that a layer was formed on the substrate (laterally elongated rectangular portion occupying the lowermost portion in the image), and the minutely uneven structure was formed on the layer. It is indicated that C was in a portion (corresponding to the protective film) other than the substrate, the layer, and the minutely uneven structure. It is further indicated that O was in the layer and the minutely uneven structure. Furthermore, it is indicated that Al was in the layer on the substrate. In addition, it is indicated that Si was in the minutely uneven structure.

According to the above-described observed matters being collectively considered as appropriate, the main component of the layer on the substrate was an oxide of Al, and the main component of the minutely uneven structure was an oxide of Si. Furthermore, by taking into consideration the other observed matters such as stability thereof, it can be said that the main component of the layer on the substrate was $Al_2O_3$, and the main component of the minutely uneven structure was $SiO_2$.

By taking into consideration the observation results of, for example, Examples 2 to 37 described below as appropriate, it can be said that the $Al_2O_3$ layer (layer on the substrate side) on the substrate and the $SiO_2$ layer (uneven layer) having the minutely uneven structure were clearly divided into two layers in some cases, and the component was gradually changed according to the position in the film thickness direction (direction perpendicular to the film) without strictly dividing the $Al_2O_3$ layer and the $SiO_2$ layer into two layers in other cases, according to differences in the material and film thickness of the Al-based manufacture intermediate film 22, and various manufacturing conditions such as a temperature of the solution SL.

When the component was gradually changed according to the position in the film thickness direction without strictly dividing the $Al_2O_3$ layer and the $SiO_2$ layer into two layers, the boundary between various films may be unclear. Furthermore, in this case, typically, in the layer on the substrate side, a component ratio of $Al_2O_3$ is higher at a position closer to the substrate, and a component ratio of $SiO_2$ to $Al_2O_3$ is higher at a position farther from the substrate. That is, in the film thickness direction, the composition ratio of $SiO_2$ to $Al_2O_3$ is proportional to the distance from the substrate.

Furthermore, the uneven layer can contain $Al_2O_3$ in a state where the $Al_2O_3$ does not become a main component. For example, the uneven layer can have a core (skeleton), of the minutely uneven structure, which contains $Al_2O_3$ as a main component, and a coating which contains, as a main component, $SiO_2$ covering a part or the entirety of the core.

Examples 2 to 37 and Comparative example 1 are described below.

Examples 2 to 37 and Comparative example 1 were manufactured similarly to Example 1. However, as indicated below in Table 2 to Table 9, in each of Examples 2 to 37 and Comparative example 1, at least one of the concentration of silica in the solution SL, a material of the Al-based manufacture intermediate film 22, a material of the base 2, a temperature of the solution SL, and a physical film thickness of the Al-based manufacture intermediate film 22 was different from that in Example 1.

All of the Al-based manufacture intermediate films 22 of Examples 2 to 37 and Comparative example 1 were formed by DC sputtering, and the process condition thereof was set for each material of the Al-based manufacture intermediate film 22 as indicated above in Table 1. In Table 1, process conditions for vapor deposition are also indicated as modifications.

TABLE 2

| | Example 1 | Example 2 | Example 3 | Example 4 | Example 5 |
|---|---|---|---|---|---|
| Concentration (mg/L) of silica | 0.06 | 0.06 | 0.06 | 0.06 | 0.06 |
| Material of Al-based intermediate film | AlN | AlN | AlN | AlN | AlN |
| Material of substrate | PC | PC | PC | PC | PC |
| Temperature (° C.) of solution | 90 | 95 | 95 | 95 | 90 |
| Thickness (nm) of Al-based intermediate film | 75 | 78.5 | 58.6 | 44.8 | 105.4 |
| Average reflectance (%) | | 0.5 | 1.31 | 1.38 | 1.43 |

TABLE 3

| | Example 6 | Example 7 | Example 8 | Example 9 | Example 10 |
|---|---|---|---|---|---|
| Concentration (mg/L) of silica | 0.06 | 0.06 | 0.06 | 0.06 | 0.06 |
| Material of Al-based intermediate film | AlN | AlN | AlN | AlN | AlN |
| Material of substrate | PC | PC | PC | PC | PC |
| Temperature (° C.) of solution | 90 | 90 | 90 | 90 | 85 |
| Thickness (nm) of Al-based intermediate film | 90.85 | 78.5 | 58.5 | 44.8 | 78.51 |
| Average reflectance (%) | 0.87 | 0.43 | 1.27 | 1.33 | 0.36 |

TABLE 4

| | Example 11 | Example 12 | Example 13 | Example 14 | Example 15 |
|---|---|---|---|---|---|
| Concentration (mg/L) of silica | 0.06 | 0.06 | 0.06 | 0.06 | 0.06 |
| Material of Al-based intermediate film | AlN | AlN | AlN | AlN | AlN |
| Material of substrate | PC | PC | PC | PC | PC |
| Temperature (° C.) of solution | 85 | 85 | 80 | 80 | 80 |
| Thickness (nm) of Al-based intermediate film | 58.5 | 44.8 | 105.4 | 90.85 | 78.51 |
| Average reflectance (%) | 1.35 | 1.33 | 1.7 | 1.11 | 0.43 |

TABLE 5

| | Example 16 | Example 17 | Example 18 | Example 19 | Example 20 |
|---|---|---|---|---|---|
| Concentration (mg/L) of silica | 0.06 | 0.06 | 0.06 | 0.06 | 0.06 |
| Material of Al-based intermediate film | AlN | AlN | AlN | AlN | AlN |
| Material of substrate | PC | PC | PC | PC | PC |
| Temperature (° C.) of solution | 80 | 80 | 75 | 75 | 75 |
| Thickness (nm) of Al-based intermediate film | 58.5 | 44.8 | 78.5 | 58.5 | 44.82 |
| Average reflectance (%) | 1.7 | 1.33 | 1.87 | 1.94 | 1.33 |

TABLE 6

| | Example 21 | Example 22 | Example 23 | Example 24 | Example 25 |
|---|---|---|---|---|---|
| Concentration (mg/L) of silica | 0.06 | 0.06 | 0.06 | 0.06 | 0.06 |
| Material of Al-based intermediate film | AlN | AlN | $Al_2O_3$ | $Al_2O_3$ | $Al_2O_3$ |
| Material of substrate | white sheet glass | white sheet glass | white sheet glass | white sheet glass | white sheet glass |
| Temperature (° C.) of solution | 90 | 90 | 90 | 98 | 90 |
| Thickness (nm) of Al-based intermediate film | 48 | 80 | 64 | 133 | 133 |
| Average reflectance (%) | 0.046 | 0.21 | 1.04 | 0.45 | 1.79 |

TABLE 7

| | Example 26 | Example 27 | Example 28 | Example 29 | Example 30 |
|---|---|---|---|---|---|
| Concentration (mg/L) of silica | 0.06 | 0.06 | 0.06 | 0.06 | 0.06 |
| Material of Al-based intermediate film | $Al_2O_3$ | $Al_2O_3$ | $Al_2O_3$ | Al | $Al_2O_3$ |
| Material of substrate | white sheet glass | white sheet glass | white sheet glass | white sheet glass | PC |
| Temperature (° C.) of solution | 95 | 95 | 90 | 90 | 90 |
| Thickness (nm) of Al-based intermediate film | 133 | 198 | 198 | 10 | 74 |
| Average reflectance (%) | 0.55 | 0.38 | 0.35 | 1.69 | 1.08 |

TABLE 8

| | Example 31 | Example 32 | Example 33 | Example 34 | Example 35 |
|---|---|---|---|---|---|
| Concentration (mg/L) of silica | 0.06 | 0.003 | 0.06 | 0.5 | 1 |
| Material of Al-based intermediate film | $Al_2O_3$ | AlN | AlN | AlN | AlN |
| Material of substrate | PC | PC | PC | PC | PC |
| Temperature (° C.) of solution | 80 | 90 | 90 | 90 | 90 |
| Thickness (nm) of Al-based intermediate film | 75 | 78.5 | 78.5 | 78.5 | 78.5 |
| Average reflectance (%) | 3.82 | 0.27 | 0.41 | 0.5 | 0.75 |

TABLE 9

| | Example 36 | Example 37 | Comparative example 1 |
|---|---|---|---|
| Concentration (mg/L) of silica | 2 | 10 | 20 |
| Material of Al-based intermediate film | AlN | AlN | AlN |
| Material of substrate | PC | PC | PC |
| Temperature (° C.) of solution | 90 | 90 | 90 |
| Thickness (nm) of Al-based intermediate film | 78.5 | 78.5 | 78.5 |
| Average reflectance (%) | 1.35 | 4.38 | 9.82 |

Figure 14:
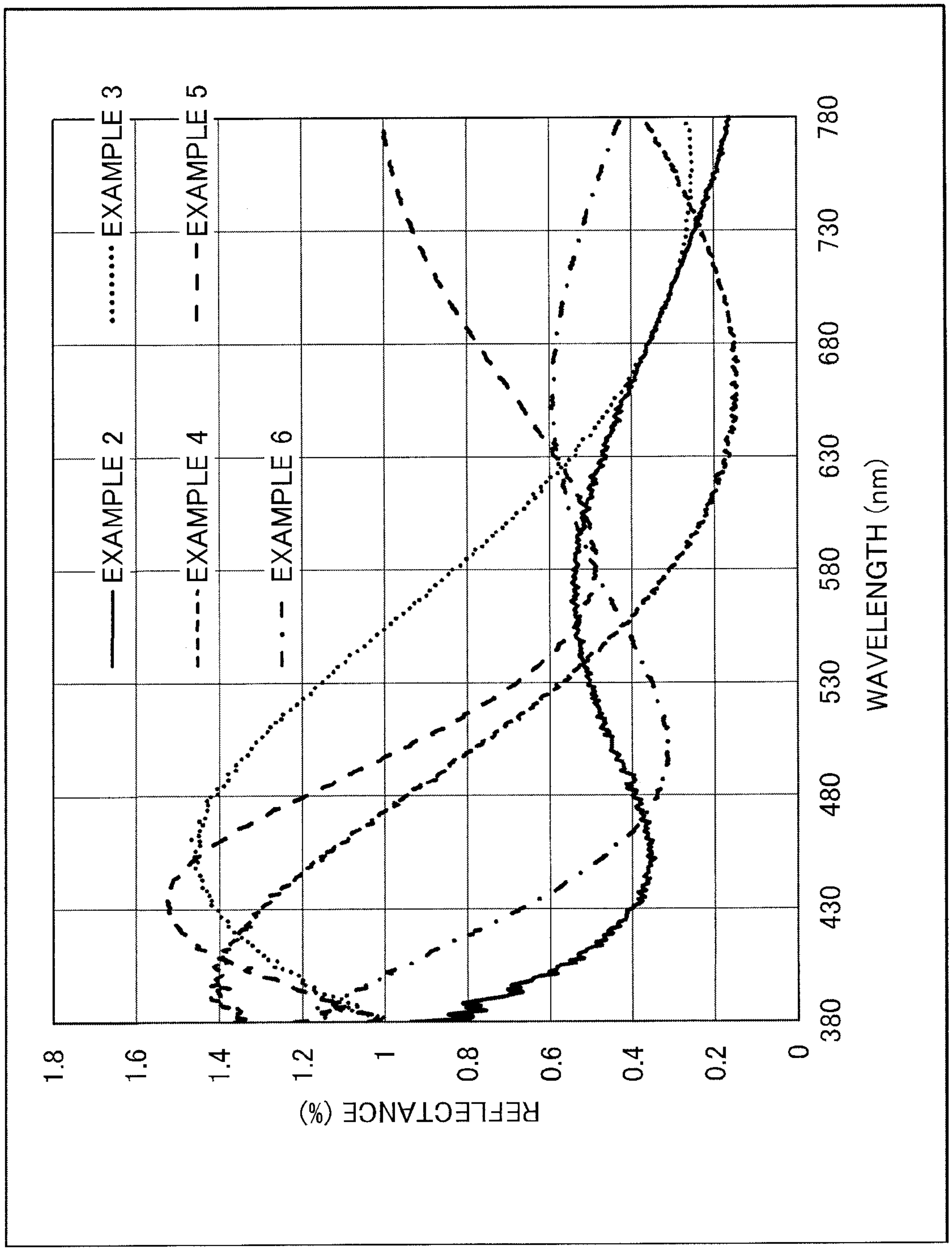
FIG. 14 shows a graph for one surface reflectance in perpendicular incidence in Examples 2 to 6.
Figure 15:
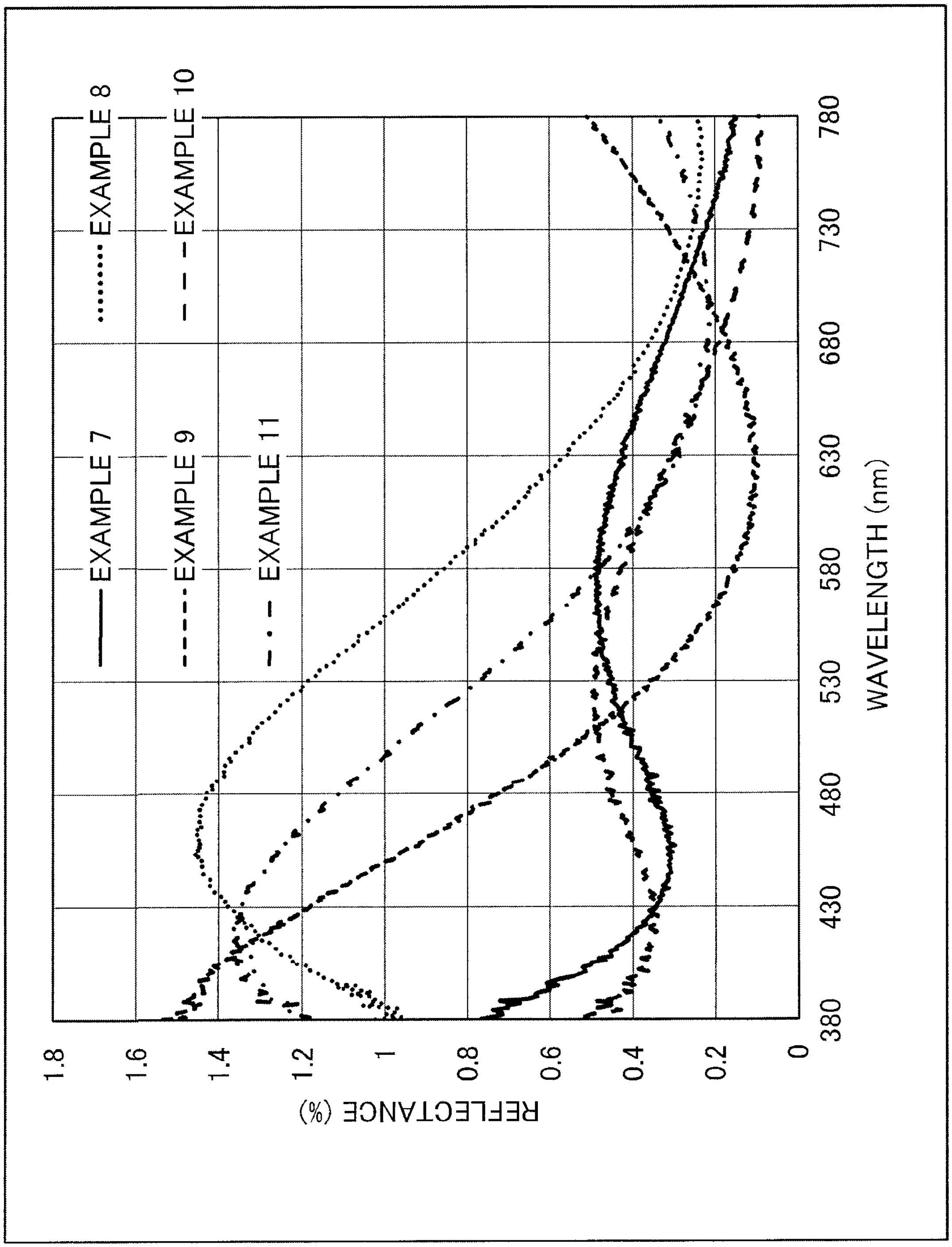
FIG. 15 shows a graph for one surface reflectance in perpendicular incidence in Examples 7 to 11.
Figure 16:
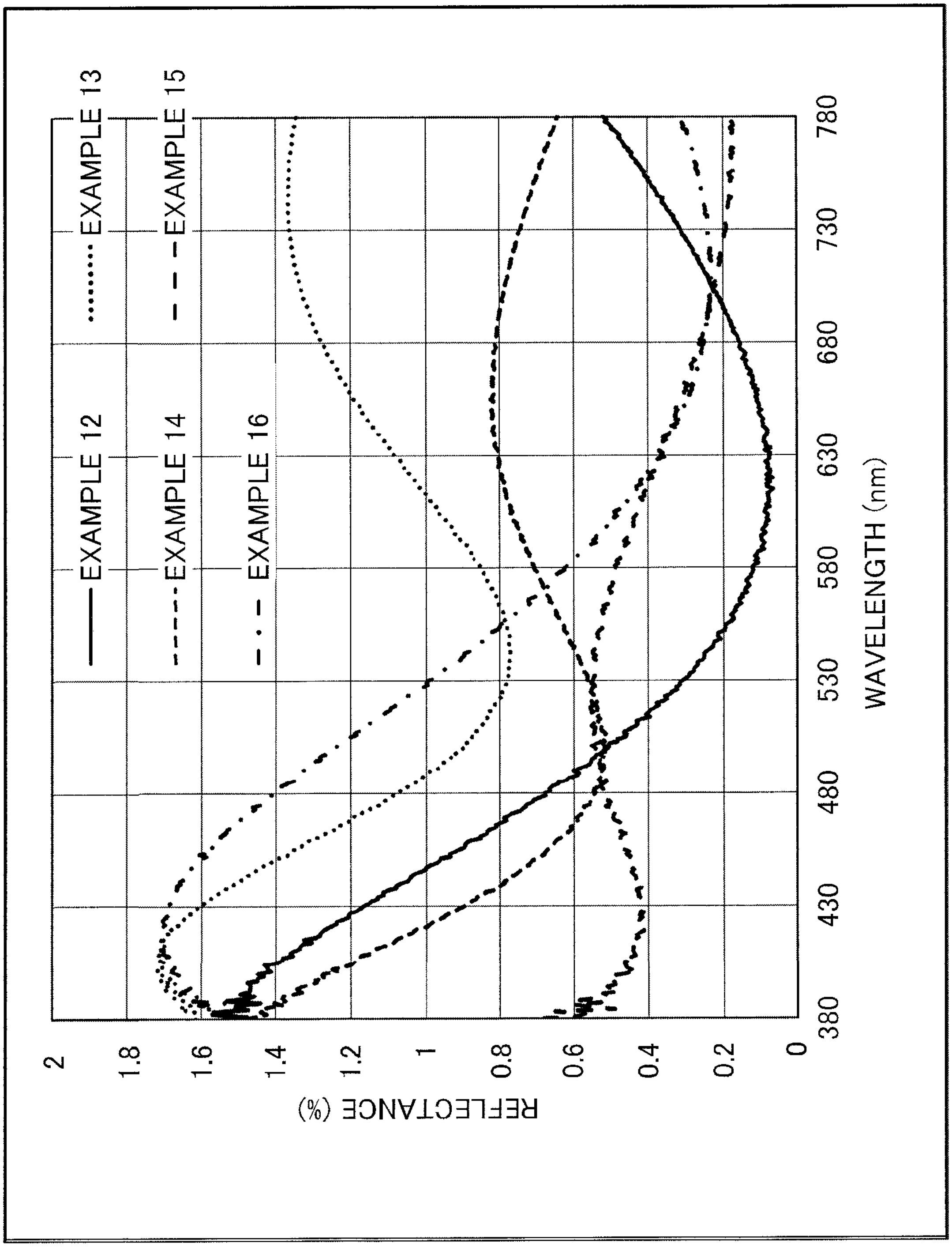
FIG. 16 shows a graph for one surface reflectance in perpendicular incidence in Examples 12 to 16.
Figure 17:
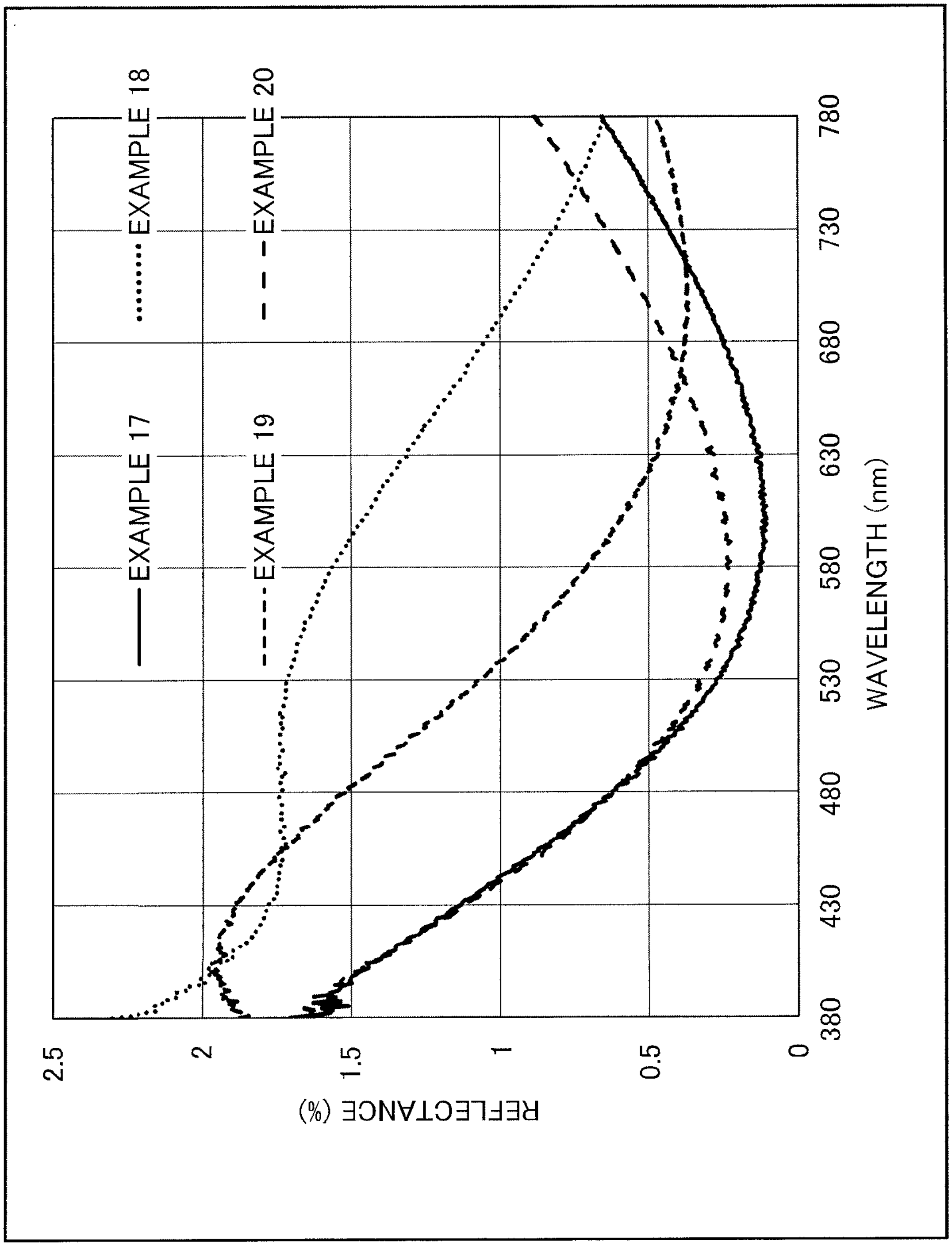
FIG. 17 shows a graph for one surface reflectance in perpendicular incidence in Examples 17 to 20.
Figure 18:
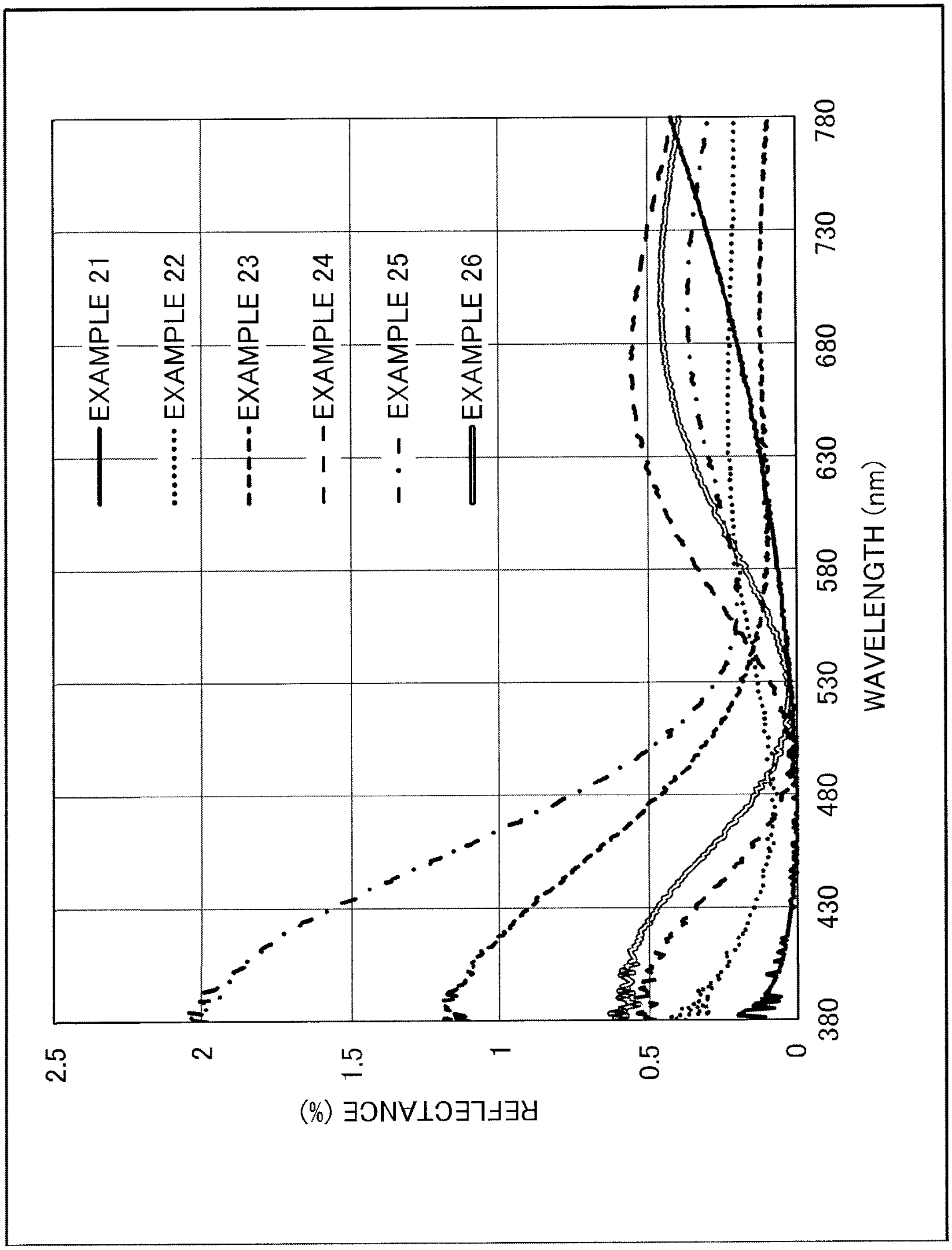
FIG. 18 shows a graph for one surface reflectance in perpendicular incidence in Examples 21 to 26.
Figure 19:
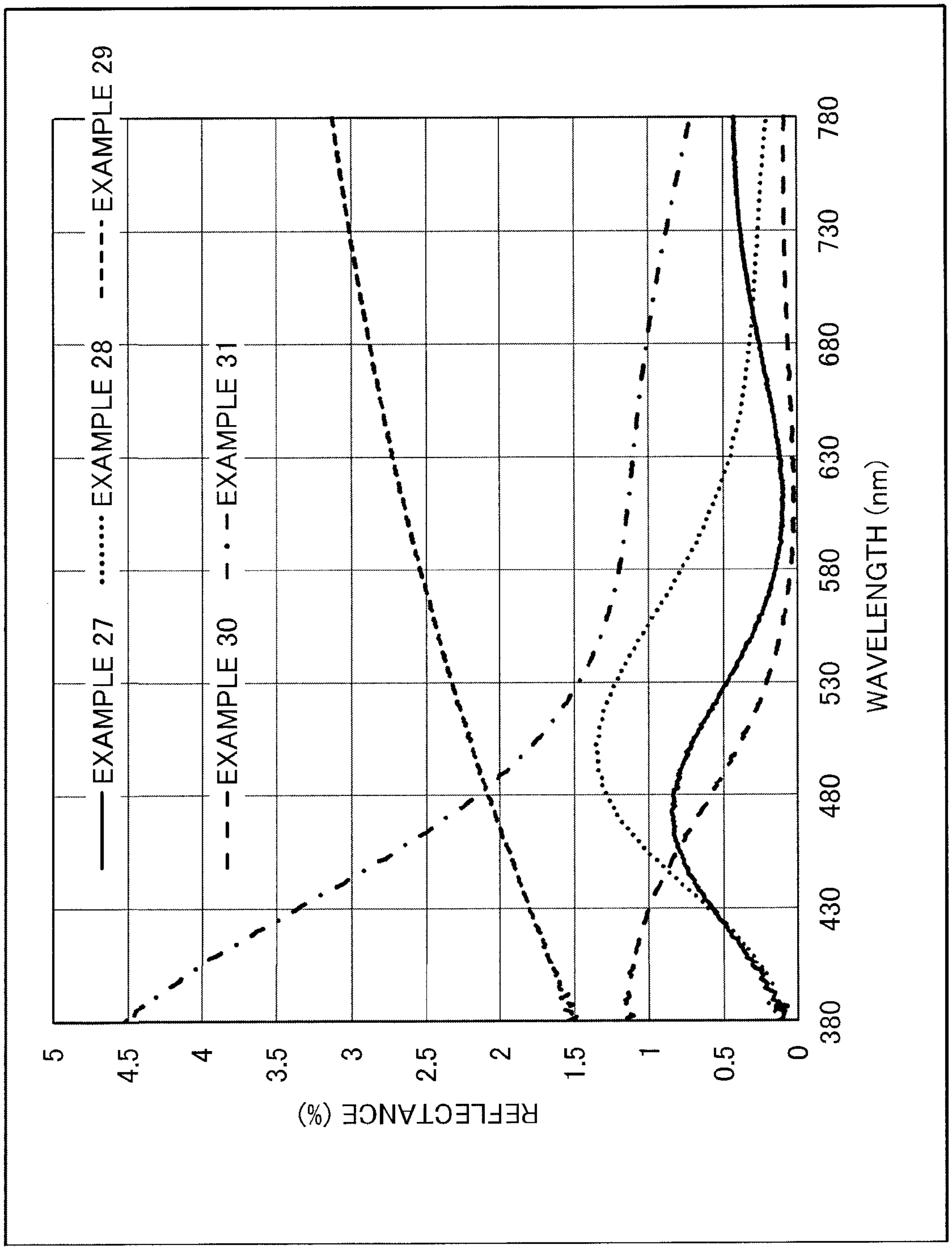
FIG. 19 shows a graph for one surface reflectance in perpendicular incidence in Examples 27 to 31.
Figure 20:
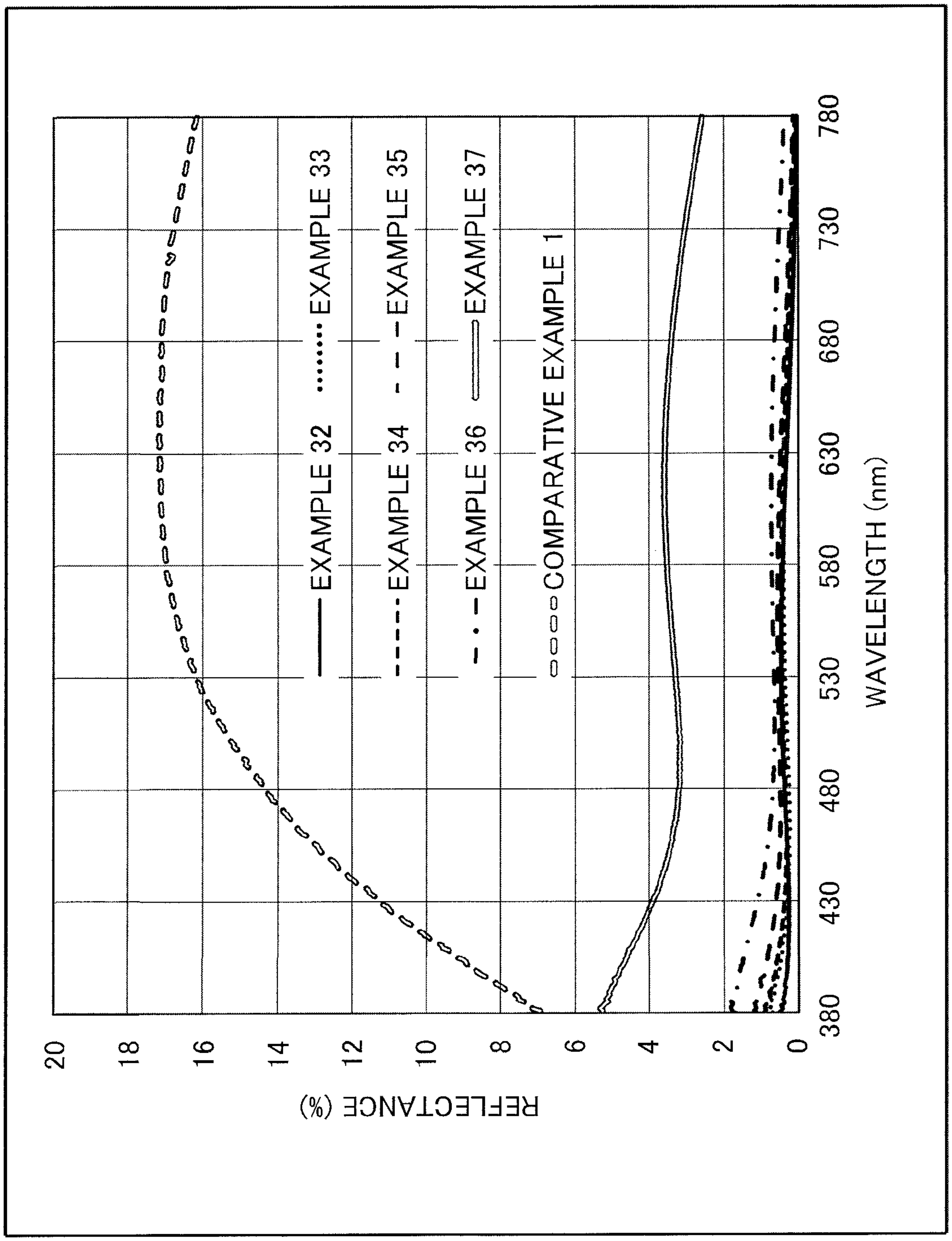
FIG. 20 shows a graph for one surface reflectance in perpendicular incidence in Examples 32 to 37 and Comparative example 1.

FIG. 14 shows a graph of one surface reflectance of light in a visible range and an adjacent range in perpendicular incidence, according to Examples 2 to 6. FIG. 15 shows a graph of one surface reflectance of light in a visible range and an adjacent range in perpendicular incidence, according to Examples 7 to 11. FIG. 16 shows a graph of one surface reflectance of light in a visible range and an adjacent range in perpendicular incidence, according to Examples 12 to 16. FIG. 17 shows a graph of one surface reflectance of light in a visible range and an adjacent range in perpendicular incidence, according to Examples 17 to 20. FIG. 18 shows a graph of one surface reflectance of light in a visible range and an adjacent range in perpendicular incidence, according to Examples 21 to 26. FIG. 19 shows a graph of one surface reflectance of light in a visible range and an adjacent range in perpendicular incidence, according to Examples 27 to 31. FIG. 20 shows a graph of one surface reflectance of light in a visible range and an adjacent range in perpendicular incidence, according to Examples 32 to 37 and Comparative example 1.

In the lowermost lines in Table 2 to Table 9, an average reflectance in each example is indicated.

According to these graphs and tables, in comparative example 1, the average reflectance was greater than 9% and was almost 10%, and it cannot be said that reflection of visible light was sufficiently inhibited.

Meanwhile, in Examples 2 to 37, similarly to Example 1, it is indicated that low reflection of visible light was realized.

According to various observations, also in Examples 2 to 37, similarly to Example 1, it was confirmed that low reflection was realized in a state where incidence angle dependency was low, and the minutely uneven structure was made of $SiO_2$ (the main component of the minutely uneven structure was a $SiO_2$ layer), and, furthermore, a layer made of $Al_2O_3$ (having $Al_2O_3$ as a main component) was formed between the minutely uneven structure and the substrate.

Particularly, in a case where the Al-based manufacture intermediate film 22 was made of AlN, the optical film 4 for antireflection was formed with various physical film thicknesses of the Al-based manufacture intermediate films 22 and various temperatures of the solution SL (Examples 1 to 20).

Furthermore, also in a case where the Al-based manufacture intermediate film 22 was made of $Al_2O_3$(Examples 23 to 28, 30 to 31) or Al (Example 29), the optical film 4 for antireflection was formed.

Moreover, even when the substrate was a white sheet glass, the optical film 4 for antireflection was formed (Examples 21 to 29).

Change of characteristics according to change of temperature of the solution SL was found by comparison among the above-described Examples 2, 7, 10, 15, and 18.

Examples 2, 7, 10, 15, and 18 were the same in the concentration (0.06 mg/l) of silica, the material (AlN) of the Al-based manufacture intermediate film 22, the material (PC) of the substrate, and the physical film thickness (78.5 to 78.51 nm) of the Al-based manufacture intermediate film 22, and were different in the temperature of the solution SL, and the temperatures of the solution SL in Examples 2, 7, 10, 15, and 18 were 95, 90, 85, 80, and 75° C., respectively.

Figure 21:
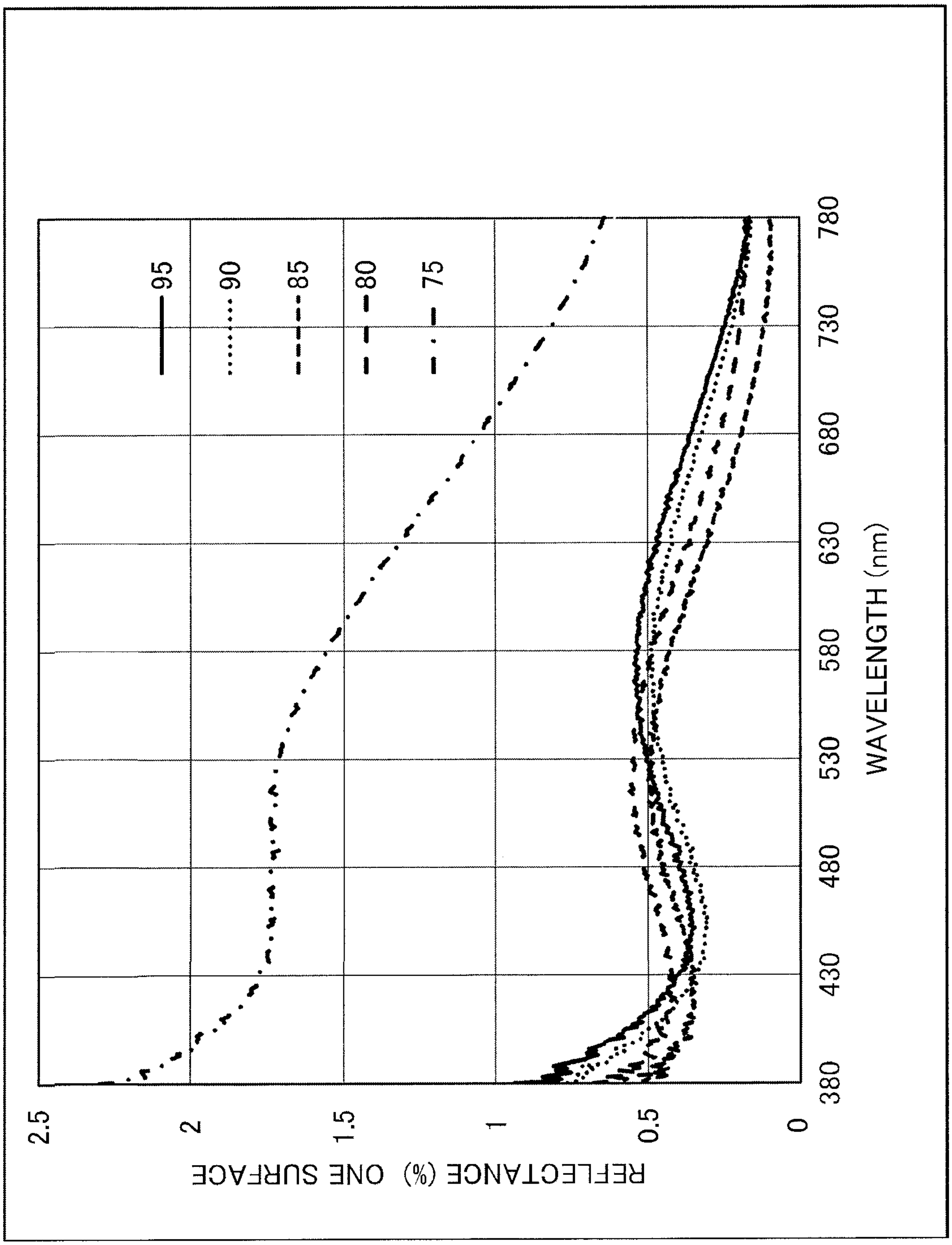
FIG. 21 shows a graph for one surface reflectance in perpendicular incidence in Examples 2, 7, 10, 15, and 18 that are different from each other in a temperature of a solution for immersion during manufacturing.

FIG. 21 shows a graph for one surface reflectance in perpendicular incidence in Examples 2, 7, 10, 15, and 18.

Figure 22:
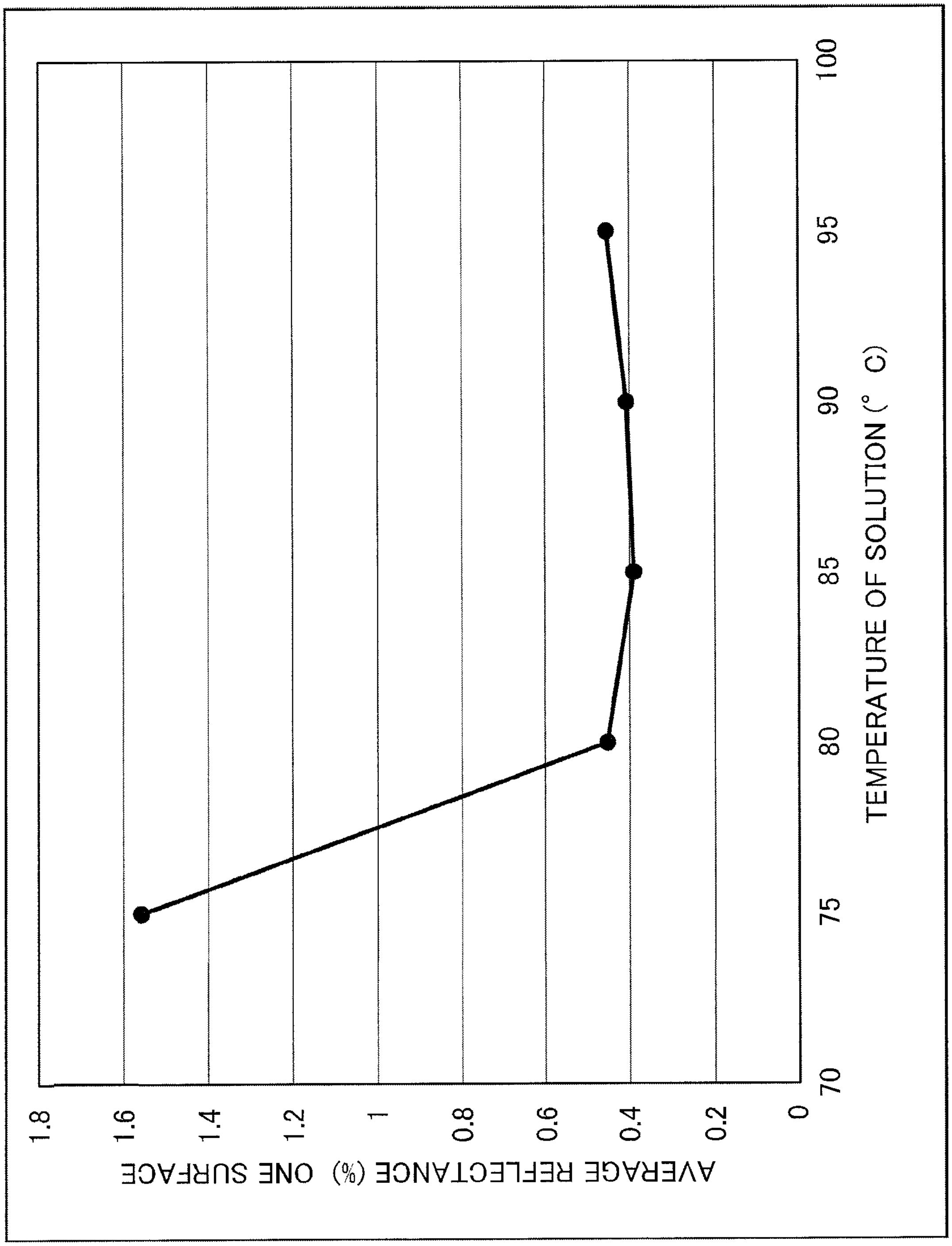
FIG. 22 shows a graph for an average reflectance in each of Examples 2, 7, 10, 15, and 18.

FIG. 22 shows a graph for the average reflectance in Examples 2, 7, 10, 15, and 18.

According to these figures, in a case where the temperature of the solution SL was not lower than 80° C., one surface reflectance was further reduced as compared with a case where the temperature of the solution SL was lower than 80° C. (Example 18).

Change of characteristics according to change of concentration of silica in solution SL was found by comparison among the above-described Examples 32 to 37 and Comparative example 1.

Examples 32 to 37 and Comparative example 1 were the same in the material (AlN) of the Al-based manufacture intermediate film 22, the material (PC) of the substrate, the temperature (90° C.) of the solution SL, and the physical film thickness (78.5 nm) of the Al-based manufacture intermediate film 22, and were different in the concentration of silica in the solution SL, and the concentrations of silica in the solution SL in Examples 32 to 37 and Comparative example 1 were 0.003, 0.06, 0.5, 1, 2, 10, and 20 mg/l, respectively.

In Example 32, the concentration of silica in the solution SL was adjusted by using pure water having an extremely high purity, as it was. In Example 33, the concentration of silica in the solution SL was adjusted by using pure water having about normal purity, as it was. the concentration of silica in the solution SL was adjusted by putting an appropriate amount of silica gel into pure water having about normal purity and sufficiently stirring the mixture. In pure water having an extremely high purity and pure water having about normal purity, a small amount of silica was not completely eliminated and was left.

The concentration of silica was obtained in the manner as described in Example 1.

The above-described FIG. 20 exactly shows Examples 32 to 37 and Comparative example 1.

Figure 23:
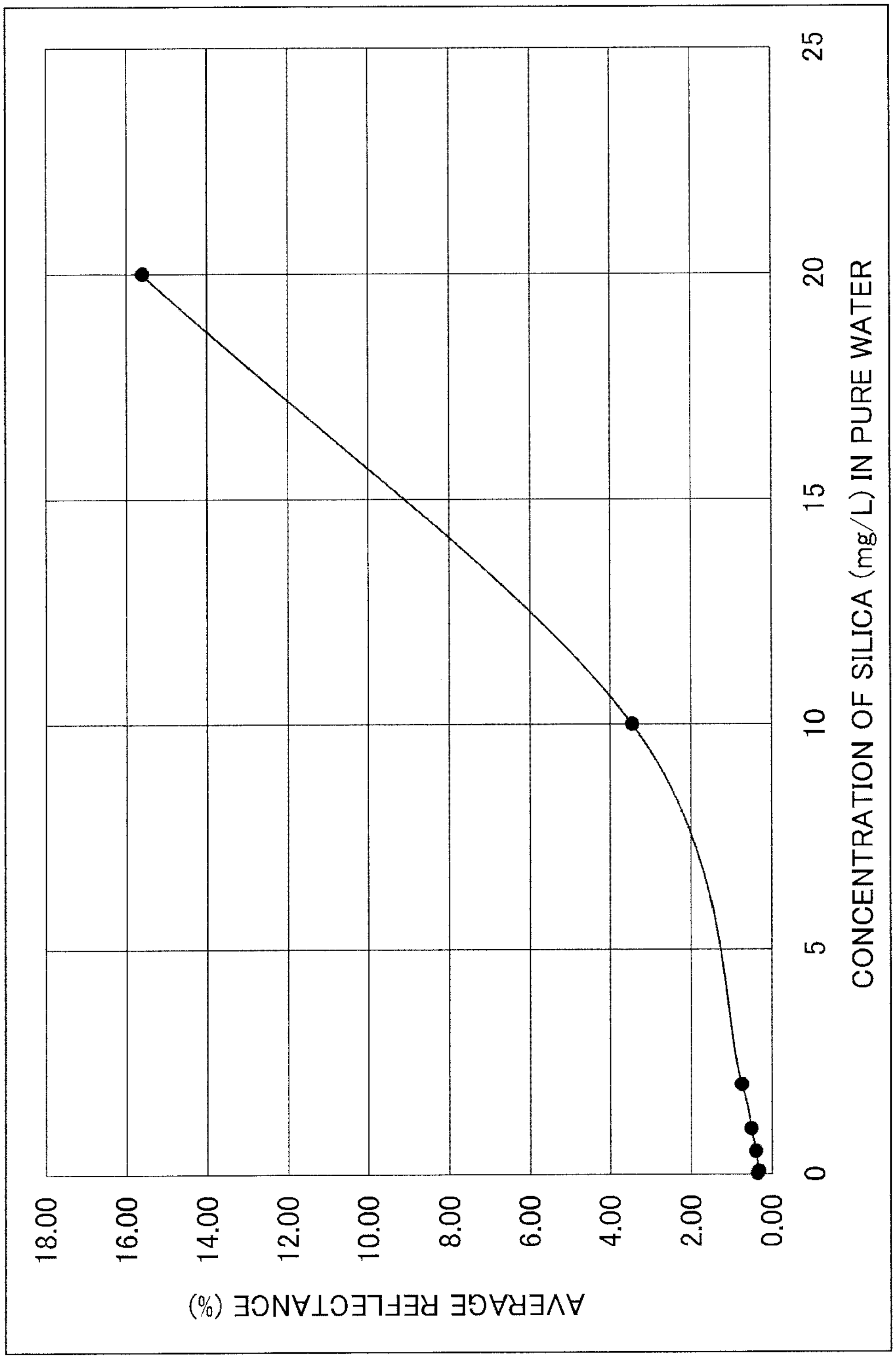
FIG. 23 shows a graph representing a relationship between an average reflectance (vertical axis) and a concentration (horizontal axis) of silica in a solution, in Examples 32 to 37 and Comparative example 1.

FIG. 23 shows a graph representing a relationship between the average reflectance (vertical axis) and the concentration (horizontal axis) of silica in the solution SL, in Examples 32 to 37 and Comparative example 1.

Table 10 indicates a relationship between the concentration of silica in the solution SL and the average reflectance in Examples 32 to 37 and Comparative example 1.

TABLE 10

| | Concentration (mg/L) of silica | | | | | | |
|---|---|---|---|---|---|---|---|
| | 0.003 | 0.06 | 0.5 | 1 | 2 | 10 | 20 |
| Average reflectance (%) at 420 to 680 nm | 0.36 | 0.33 | 0.4 | 0.52 | 0.75 | 3.46 | 15.63 |

According to these figures and tables, in a case where the concentration of silica in solution SL was not greater than 10 mg/l, one surface reflectance was further reduced as compared with a case (Comparative Example 1) where the temperature of the solution SL was greater than 10 mg/l. In a case where the concentration of silica in solution SL was not greater than 2 mg/l, one surface reflectance was further reduced as compared with a case (Example 37, Comparative example 1) where the temperature of the solution SL was greater than 2 mg/l.

In Comparative example 1, the Al-based manufacture intermediate film 22 was not changed in the solution SL, and the Al-based manufacture intermediate film 22 was left as AlN in the form of a layer.

In a reference example different from the examples and the comparative example described above, the Al-based manufacture intermediate film 22 similar to those in Examples 32 to 37 and Comparative example 1 (except for the concentration of silica in the solution SL) was immersed in tap water heated to 90° C. as the solution SL, for three minutes. In the reference example, as in Comparative example 1, an effect of reducing reflectance was not exhibited, and the Al-based manufacture intermediate film 22 did not change. The concentration of silica in the tap water was 20 mg/l.

In Examples 1 to 37, the base 2 (substrate), and the optical film 4 formed directly on the film-formation surface F of the base 2 are provided, and the optical film 4 has the $Al_2O_3$ layer 12 that is made of $Al_2O_3$ and is disposed on the base 2 side, and the $SiO_2$ layer 14 that is made of $SiO_2$ and that has the minutely uneven structure. Alternatively, in Examples 1 to 37, the base 2 (substrate), and the optical film 4 formed directly on the film-formation surface F of the base 2 are provided, and the optical film 4 has the $Al_2O_3$ layer 12 that contains $Al_2O_3$ as a main component and that is disposed on the base 2 side, and the $SiO_2$ layer 14 that contains $SiO_2$ as a main component and that has the minutely uneven structure.

Therefore, the base 2 (optical product 1) having the optical film 4 that exhibits an antireflection effect in a state where the incidence angle dependency is low, is provided.

The manufacturing method according to Examples 1 to 37 includes forming, on the base 2 (substrate), the Al-based manufacture intermediate film 22 made of aluminium, an aluminium alloy, or an aluminium compound, and immersing the base 2 having the Al-based manufacture intermediate film 22 in an aqueous solution of silica (the solution SL), and the concentration of silica in the solution SL is less than or equal to 10 mg/l unlike Comparative example 1 (20 mg/l). Accordingly, the optical product 1 including the optical film 4 that has the minutely uneven structure made of $SiO_2$ and that exhibits an antireflection effect in a state where the incidence angle dependency is low, is obtained.

In the manufacturing method according to Examples 1 to 17, and 21 to 37, the solution SL (aqueous solution) has a temperature of not lower than 80° C. and not higher than 100° C. In the manufacturing method according to Examples 1 to 37, the Al-based manufacture intermediate film 22 is made of at least one of Al, $Al_2O_3$, AlN, and AlON. Therefore, the optical product 1 having the optical film 4 that more advantageously exhibits the antireflection effect, is obtained.

The invention claimed is:

1. An optical product comprising:

a base; and an optical film formed directly on a film-formation surface of the base, wherein the optical film has a layer having a compositional distribution in which a composition ratio of $SiO_2$ to $Al_2O_3$ continuously increases along a thickness direction of the optical film from a side facing the film-formation surface of the base, and a surface of the optical film has a nanoscopically uneven structure containing $SiO_2$ as a main component, wherein the nanoscopically uneven structure is at least one of a multiple-pyramids-shaped structure and a needle-array structure.

2. The optical product according to claim 1, wherein, in the compositional distribution, a content ratio of $Al_2O_3$ to $SiO_2$ is higher toward the film-formation surface of the base, and a content ratio of $SiO_2$ to $Al_2O_3$ increases along the thickness direction away from the base.

3. The optical product according to claim 2, wherein the optical film comprises:

an $Al_2O_3$ layer disposed on the base; and an $SiO_2$ layer formed over the $Al_2O_3$ layer on a side opposite to the base and continuous with the $Al_2O_3$ layer.

4. The optical product according to claim 1, wherein the optical film comprises:

an $Al_2O_3$ layer disposed on the base; and an $SiO_2$ layer formed over the $Al_2O_3$ layer on a side opposite to the base and continuous with the $Al_2O_3$ layer.

5. An optical product manufacturing method comprising:

forming, directly on a base, an aluminium-based manufacture intermediate film made of aluminium, an aluminium alloy, or an aluminium compound; and immersing the base having the aluminium-based manufacture intermediate film in an aqueous solution of silica, wherein the silica in the aqueous solution has a concentration of not greater than 10 mg/l, the aluminium-based manufacture intermediate film is changed to an optical film by immersing the base having the aluminium-based manufacture intermediate film in the aqueous solution, and the optical film has an $Al_2O_3$ layer that contains greater than 50 percent by weight $Al_2O_3$ and that is disposed on a side facing the base, and an $SiO_2$ layer that contains greater than 50 percent by weight $SiO_2$ and that has a nanoscopically uneven structure.

6. The optical product manufacturing method according to claim 5, wherein the aqueous solution has a temperature of not lower than 80° C. and not higher than 100° C.

7. The optical product manufacturing method according to claim 5, wherein the aluminium-based manufacture intermediate film is made of at least one of Al, $Al_2O_3$, AlN, and AlON.

8. The optical product manufacturing method according to claim 5, wherein the minutely uneven structure is at least one of a multiple-pyramids-shaped structure, and a needle-array structure.

* * * * *